US007181578B1

(12) United States Patent
Guha et al.

(10) Patent No.: US 7,181,578 B1
(45) Date of Patent: Feb. 20, 2007

(54) METHOD AND APPARATUS FOR EFFICIENT SCALABLE STORAGE MANAGEMENT

(75) Inventors: Aloke Guha, Louisville, CO (US); Gary B. McMillian, Austin, TX (US); Chris T. Santilli, Colorado Springs, CO (US)

(73) Assignee: Copan Systems, Inc., Longmont, CO (US)

( * ) Notice: Subject to any disclaimer, the term of this patent is extended or adjusted under 35 U.S.C. 154(b) by 148 days.

(21) Appl. No.: 10/393,390

(22) Filed: Mar. 21, 2003

Related U.S. Application Data

(60) Provisional application No. 60/409,980, filed on Sep. 12, 2002.

(51) Int. Cl.
*G06F 12/00* (2006.01)
(52) U.S. Cl. ...................................... 711/154
(58) Field of Classification Search ................ 711/105, 711/118; 370/395
See application file for complete search history.

(56) References Cited

U.S. PATENT DOCUMENTS

| | | | | |
|---|---|---|---|---|
| 6,076,148 | A * | 6/2000 | Kedem | 711/162 |
| 6,145,028 | A * | 11/2000 | Shank et al. | 710/31 |
| 6,314,503 | B1 * | 11/2001 | D'Errico et al. | 711/165 |
| 6,751,703 | B2 * | 6/2004 | Chilton | 711/113 |
| 6,854,034 | B1 * | 2/2005 | Kitamura et al. | 711/113 |
| 6,957,433 | B2 * | 10/2005 | Umberger et al. | 718/103 |
| 2003/0172149 | A1 * | 9/2003 | Edsall et al. | 709/224 |
| 2004/0233910 | A1 * | 11/2004 | Chen et al. | 370/395.5 |

OTHER PUBLICATIONS

HyperTransport, Brian Holden, Netronics Jul./Aug. 2002.*

* cited by examiner

*Primary Examiner*—Hyung Sough
*Assistant Examiner*—Duc T Doan
(74) *Attorney, Agent, or Firm*—Brian N. Young; Trellis Intellectual Property Law Group, PC

(57) ABSTRACT

A hybrid centralized and distributed processing system includes a switching device that connects a storage processor to one or more servers through a host channel processor. The switching device also connects the storage processor to one or more storage devices such as disk drive arrays, and to a metadata cache and a block data cache memory. The storage processor processes access request from one or more servers in the form of a logical volume or logical block address and accesses the metadata cache to determine the physical data address. The storage processor monitors the performance of the storage system and performs automatic tuning by reallocating the logical volume, load balancing, hot spot removal, and dynamic expansion of storage volume. The storage processor also provides fault-tolerant access and provides parallel high performance data paths for fail over. The storage processor also provides faster access by providing parallel data paths for, making local copies and providing remote data copies, and by selecting data from a storage device that retrieves the data the earliest.

39 Claims, 12 Drawing Sheets

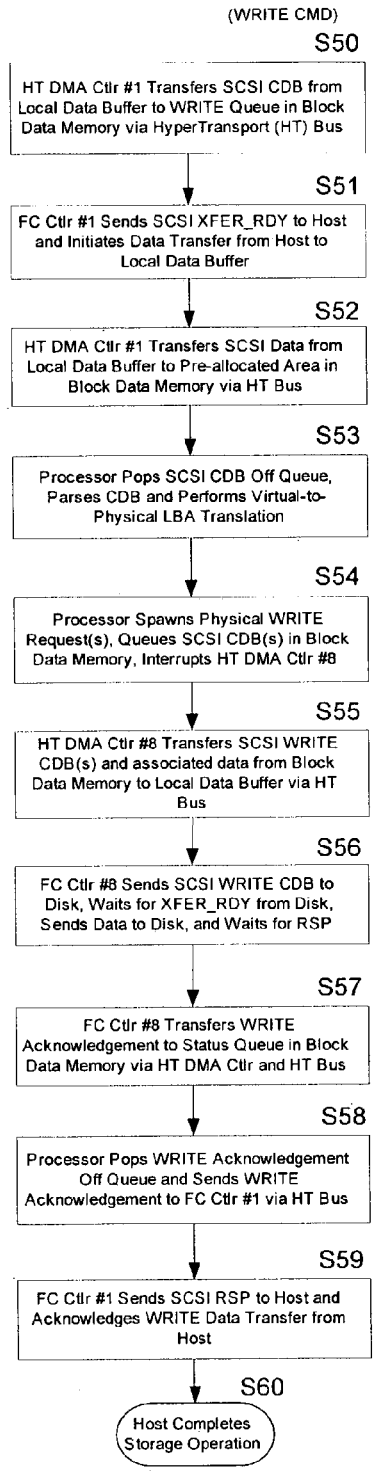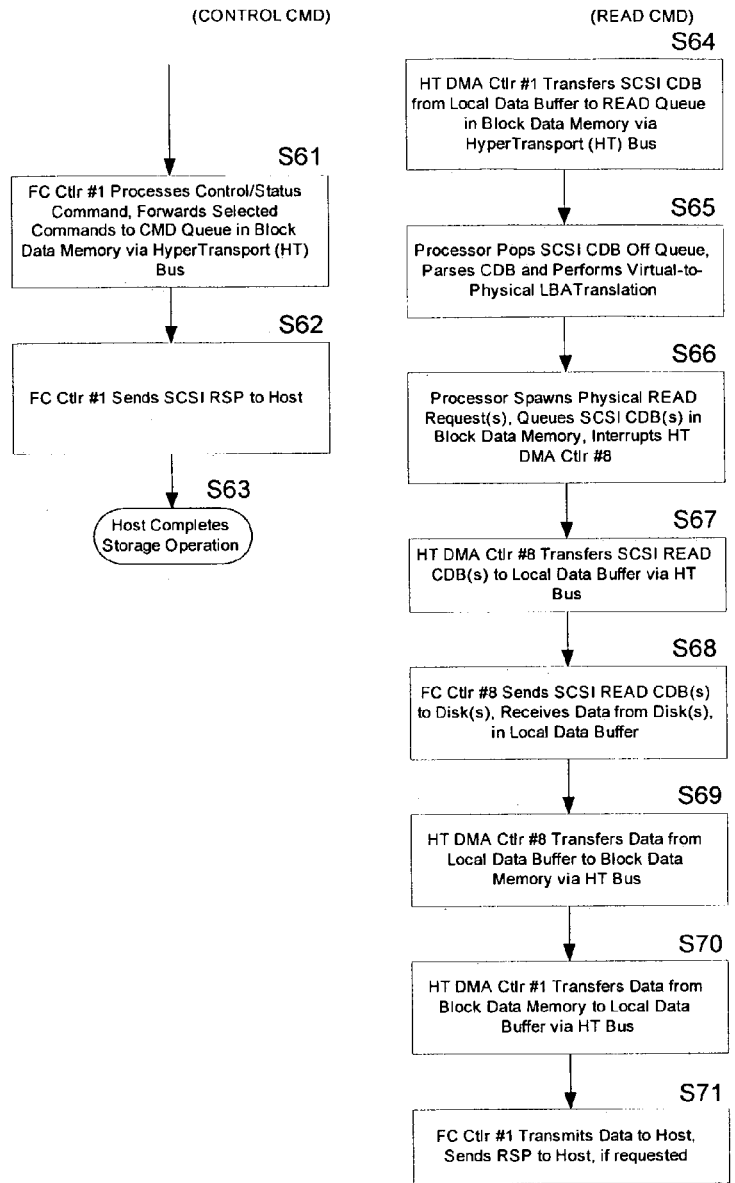
Fig. 8A   Fig. 8B   Fig. 8C

METHOD AND APPARATUS FOR EFFICIENT SCALABLE STORAGE MANAGEMENT

The present application claims priority from Provisional Application U.S. Ser. No. 60/409,980 filed on Sep. 12, 2002, herein incorporated by reference.

FIELD OF THE INVENTION

The present invention relates to the design of very cost-efficient yet scalable storage system that uses centralized storage processors and caches but distributed intelligent channel processors to both handle host storage requests and storage devices.

BACKGROUND OF THE INVENTION

Current mass storage systems, henceforth referred to as storage systems, are typically external to host computers and other applications. These storage systems face increasing demands that require ever increasing storage volume capability, and performance in access, giving rise to issues of scalability in capacity, performance, flexibility in changing to application needs, growth and ease of management of the storage devices.

A typical storage system has a centralized storage infrastructure that allows multiple servers to access a large volume of centrally managed storage information. Centrally managed storage systems enable automation of the administration of storage services allowing efficient storage management. One approach to centralization is a virtualization technique that provides the storage users with a virtual pool of storage, from which a logical volume of storage can be offered to the application or user.

A typical storage system must be able to meet the numerous and changing needs of the users such as the ability to be easily scale to meet the demand of growing application data. Additionally, the ability of the storage system to allow growth of I/O (input/output) bandwidth is also a concern. For many applications the information stored by the storage system must be constantly available to avoid unplanned downtime.

As the typical storage system expands capacity, the capability to access the stored information must increase as well. In this manner, growing storage capacity and users increase the need for automated storage management, which typically includes provisioning storage flexibly with different service levels to applications, creating replicated or backed-up copies, recovering from any storage device failures, etc.

The typical mass storage system interacts with a variety of applications, each of which may have different characteristics and priorities in terms of access and I/O performance, besides availability, back up, recovery and archiving needs. This results in management complexity since each storage consuming application demands different performance factors of every application when analyzing and provisioning its storage.

A number of storage technologies have been developed and have emerged to address the above needs of storage systems and storage management. Networked storage systems, such as storage area networks (SANs) and network attached storage (NAS) and their associated storage management software, have addressed the requirements of scalability, availability, and performance, as well as managing the complexity of storage that affect the total cost of ownership (TCO) of storing information.

SANs (Storage Area Networks) are targeted at providing scalability and performance to storage infrastructures by creating a separate network to connect servers to storage devices (such as tape drives, automated tape libraries, and disk drive arrays) and transfer block-level data between servers and these devices. The primary advantage of a SAN is scalability of storage capacity and I/O without depending on the local area network (LAN), thereby improving application performance. SANs are generally based on the Fibre Channel (FC) protocol.

A NAS (Network Attached Storage) device sits on the LAN and is managed as a network device that serves files. Unlike SANs, NAS has no special networking requirements, which greatly reduces the complexity of implementing it. NAS is easy to implement but difficult to maintain when multiple devices are deployed, increasing management complexity.

Virtualization software and storage systems logically manage storage devices as if they were a single entity by abstracting the physical connections between the storage devices and the servers. When applied across multiple storage devices, virtualization not only provides simplified storage management through centralized control, but it also enables other functions to support applications such as providing transparent growth of storage independent of physical storage device limits. Other advantages include delivering fault tolerance, and creating transparent replication for data availability, and performance tuning transparent to the application or host computers. U.S. Pat. No. 4,467,421 to White, titled Virtual Storage System And Method granted on Aug. 21, 1984 and IEEE [IEEE94], the Mass Storage Systems Reference Model, Version 5, are two instances of how virtualization of storage can provide these and new storage management functions.

Virtual storage management can be implemented either in software in the host computer, in the external storage system or appliance as described in U.S. Pat. No. 4,467,421, or in an intelligent SAN switch. In terms of scalability, virtualization embedded in an external storage system or in the SAN switch offers a high degree of scalability and flexibility.

Storage Resource Management (SRM) software provide centralized monitoring, alerting, and reporting of the state of specified storage assets within the center. By monitoring, reporting, and providing event management of storage devices, typically, indicating whether predetermined thresholds are exceeded, SRM provides alerts for system administrators to analyze and take necessary actions. It also enables administrators and analysts in the data center to plan the efficient use of storage.

Storage Area Management (SAM) refers to the management of all storage devices and systems in a networked storage to meet storage management needs for host applications sharing storage across the network. Desired features that need support include: automated allocation or expansion of storage volume, the unit of storage composed of contiguous blocks, as needed by the host application; reallocation of storage in the event of discrete storage device (drive or array) failures; retuning or migration of physical storage data from one set of disks or arrays to another in the event of performance degradation or failure without disruption to the host applications; and maximizing the efficiency of storage capacity used across all storage devices.

While the need for scaling access to storage in a networked environment has lead to the growing adoption of SAN and NAS, there has been a greater need for storage management. The motivation for storage management is the lowering of the total cost of ownership (TCO) by increasing data availability, managing allocation of storage for applications, and assuring application performance as it depends on storage. In summary, new storage systems, especially scalable storage systems or appliances have to support: the centralization of storage resources, especially storage devices, using virtualization so that host applications are not burdened with the details of physical storage limitations; SRM functions of the networked storage devices or efficient storage planning and usage; and SAM functions in the event that the storage devices are part of a SAN infrastructure Two basic architectures have been traditionally used to build storage systems. The first basic architecture is a Centralized Storage Controller Model; the central storage controller is shown in FIG. 1. Typical storage controllers in this model follow the RAID controller model described first in D. Patterson, G. Gibson, and R. Katz, "A Case for Redundant Array of Inexpensive Disks (RAID)," International Conference on Management of Data (SIGMOD), June 1988, where the controller module shields the storage users or host servers from the details of the physical disk drives, and makes it appear as a single reliable high-capacity disk drive. In most RAID configurations, application data from the server is distributed across a multiplicity of drives, via disk adapters, together with XOR parity redundancy data, for reliability reasons.

To improve performance of RAID WRITE operations that require parity computations, most storage controllers use a cache memory. In addition, the cache module also can improve read performance by caching data blocks that exhibit temporal locality, i.e., data blocks that are frequently accessed. Thus, the cache can be used to storage data blocks for both READ and WRITE operations.

In addition, the storage controller could use the cache memory to maintain information of how the data blocks accessed by the server are mapped to the segments on the physical drives. Typically, this requires the logical block addresses (LBAs) of storage allocated to applications in the server to be mapped to physical block addresses (PBAs) on physical disk drives. Such mapping of LBAs to PBAs, as well information of the state of the storage blocks being used, etc., constitutes storage metadata that is also maintained and continuously updated by the controller. Storage metadata for block data can also be cached in the cache memory to accelerate the performance of READ and WRITE operations.

A typical centralized approach is shown in FIG. 1 where a storage processor 4 that performs all the RAID function is shown attached to a shared data bus 8. Servers 1 attach to the storage processor 4 through host adapter interfaces 3, also referred to as host bus adapters, that execute storage connectivity protocols such as SCSI or Fibre Channel. A cache memory 7 used to cache both block data and storage metadata is also attached to bus 8.

We describe how a simple storage operation is executed on this architecture. Storage READ requests, for example, arrive at the storage processor 4, which references metadata information typically on the cache module. From the metadata, the storage processor 4 can determine both the physical location of the data blocks requested, as well as if the block is currently cached in the cache memory 7. If cached, the data blocks can then be read from the cache memory 7 and directed by the storage processor 4 to the appropriate host adapter 3 for the requesting server 1. If the data is not cached, the data block is read from the array of physical drives 6, i.e., the stripes of data are read from the drives in RAID set for the data block. FIG. 1 does not show specialized hardware such as XOR devices that can be used during WRITE to compute the parity stored in the RAID set. Access to the physical drive 6 is through the disk adapter 5 that communicates through the native disk interface, SCSI, IDE or Fibre Channel, for example.

The limitation in the performance of the controller of FIG. 1 is inherent in the serial computational model. The bottleneck is determined by the lowest performing entity, which could be any one of the shared data bus 8, the bandwidth of the cache memory 7, or the storage processor 4. While the single bus 8, single processor 4, and cache memory 7 are simpler to manage, the number of input output (I/O) operations per second (IOPs) as well as the data rate are severely limited.

The natural alternative to the single controller model is to build a distributed computing model. FIG. 2 shows one typical distributed computing model where multiple single storage controllers 10 are used to increase the number of parallel I/O storage operations. In this case, each controller has a local cache memory 7 for caching both data and metadata that could be requested by the servers 1 directly attached to the storage system through host adapters 3. Since the data block for the local attached server 1 can be located on any disk or array of disks 6 behind the switch 12 as illustrated in FIG. 2, the storage controller 10 and cache memory units 7 are interconnected by a data switch 12 that allows concurrent access to multiple disks or disk arrays 6. The architecture is effectively an MIMD (multiple instruction multiple data) parallel processing scheme.

FIG. 2 illustrates a distributed storage controller 10 and cache memories 7 as known in the prior art. The advantages of this architecture is that in an N-way (N>1) controller scheme there are some obvious scalability gains over the single controller, including: N times the storage processing; N times the total cache capacity; switched access from a storage controller to backend disk arrays increases the number of possible date paths and data rate. If an N×M switch is used, any of the N storage controllers can access the M disk arrays via M data paths.

While the system illustrated in FIG. 2 provides an increase in storage processing and data bandwidth, there is also a concomitant increase in the cost of the controller. The advantage in cost performance is in the amortized cost of the switch across N storage controllers and M disk arrays.

However, the distributed computing model suffers from the (metadata and data) cache synchronization problem. Since the logical storage blocks presented to the server 1 can be located in any of the backend disk arrays 6, updates and accesses to any of the disk arrays 6 will change metadata information, as well as the contents of the cache memories 7. The implication of cache synchronization is that cache data and metadata have to be updated frequently when there is any significant WRITE activity to the disk arrays 6. This implies that with low READ/WRITE ratios, cache synchronizations will require data and metadata to be moved across the switch 12 and across the storage controllers 10. This will result in performance penalties.

A key concern when considering either architecture is that it is difficult to readily scale performance without avoiding significantly increasing cost. There have been a number of variations on the distributed storage controller model that have attempted to improve performance as discussed herein below.

U.S. Pat. No. 5,720,028 describes a two (or multiple) controller storage system that share a common management memory for storing metadata for the storage controllers, each of which accesses this memory to monitor the operational states of other storage controllers. In a two-controller model, the controllers can be used in load balancing mode to improve performance as well as a redundant mode where the second controller is used as a backup in the case of a failure of the first. No explicit storage management functions are provided, and no efforts are made to optimize the cost for performance.

U.S. Pat. No. 5,819,054 describes a complex architecture using a bank of cache modules and cache switches interposed between host adapters and disk adapters. Multiple busses interconnect the adapters to the cache units and the cache switches. While this provides significant increase in the number of data paths and bandwidth as well as redundancy, there is a large number of interconnected components and associated cost.

A more recent alternate approach to scaling performance is the use of a central shared cache in a distributed storage controller model. U.S. Pat. No. 6,381,674 specifies a method that allows multiple storage controllers sharing access to multiple storage devices (disks/arrays) by using a centralized intelligent cache. The intelligent central cache provides substantial processing for storage management functions, such as RAID management functions, parity generation and checking, as well as RAID geometry (striping) management. The storage controllers, RAID controllers, transmit cache requests to the central cache controller. The central cache controller performs all operations related to storing supplied data in the cache memory as well as posting such cached data to the disk array as needed. The storage controllers are significantly simplified because they do not need to duplicate local cache memory on each storage controller. Furthermore, the penalty of inter-storage controller communication for synchronizing local caches is avoided. U.S. Pat. No. 6,381,674 provides a variation of using a pure distributed computing architecture to enable efficient processing storage by modifying the system of FIG. 2 is to aggregate all local caches into a central cache with RAID processing.

However, the manner in which a storage management functions, such as SRM and SAM described earlier, which are supported beyond RAID were not described in any of the previous approaches. We now examine how these features have been supported in other existing approaches.

There are several considerations for supporting storage management in a storage system, including: virtualization, creating local or remote data copies for increased data availability, implementing methods for storage placement for performance optimization, and retuning storage allocation for performance optimization. All of these aim to meet the requirements of scalability, increased I/O capabilities, downtime avoidance, automation of management, and managing (optimizing) performance.

U.S. Pat. No. 4,467,421 defines the first disclosed storage virtualization system that used intermediate storage processing to decompose user data into blocks of a size suitable for the target storage device, and allocates the blocks to physical locations, across multiple heterogeneous storage arrays or devices, without involvement of any host or user. The disclosed virtualization system also relies on cache data to improve performance in the access of data which is frequently accessed. U.S. Pat. No. 6,216,202 describes how multiple logical volumes presented to a host can be mapped to a storage system comprising multiple storage devices, and where the logical volumes span the storage devices. It also specifies how the hosts can access a logical volume via multiple paths for purposes of best performance and failover in case of path failures. No specific architecture is described to provide the most cost-effective means to support virtualization.

Data availability schemes are generally specified in terms of protocols between multiple storage systems. U.S. Pat. No. 5,544,347 specifies how a primary storage controller coordinates the copying of the primary data to the secondary storage controller, including the acknowledgement of the data copied and the level of synchronization reached. U.S. Pat. No. 6,397,229 discloses how a storage controller manages outboard incremental backup/restore of data, and specifies a storage-controller-managed outboard incremental backup/restore uses an indicator that specifies if a physical sector of the data storage device has been backed up or not.

Performance optimization techniques are done by careful selection of physical storage location at allocation time, or by reallocating physical storage, for the same logical storage, to optimize performance. A number of different yet common sense approaches have been used. U.S. Pat. No. 6,314,503 specifies a method for managing the placement of data in a storage system to achieve increased system performance by detecting and improving performance by such techniques as load balancing logical volumes hot spots by reallocating to less used physical volumes, etc. U.S. Pat. No. 5,956,750 specifies a particular method for reallocating logical to physical disk devices using a storage controller based on access frequency and sequential access ratio calculations. U.S. Pat. No. 6,209,059 specifies a particular method for the on-line reconfiguration of the logical volumes of a storage system by rearranging the request queue and redefining device queues within request queue of the storage controller to accommodate new devices or to recapture queue storage associated with deleted devices. U.S. Pat. No. 5,623,598 specifies a method of explicitly sampling a performance metric during operation of the storage system and using the performance history to determine how the storage system is performing, and exploring different factors (such as queue size, memory, upgrade disk, rebalance disks) that can improve performance.

While a number of different algorithmic and procedural techniques have been suggested, there has been no effort to create a cost-effective design of the architecture that would best support the management features discussed above.

SUMMARY OF THE INVENTION

The present invention creates an optimized system architecture that improves on the traditional approaches for building storage controllers. As discussed with reference to the prior art, a typical single controller system provides limited storage I/O performance but at low cost. Higher performance storage systems can be achieved using distributed controller models but at much higher price given the use of multiple individual storage controllers, cache memory modules, and switching fabric or interconnect.

Our approach optimizes the cost of the architecture in terms of components of cost while supporting scalable I/O, both supporting multiple servers or application hosts and storage devices, and has the ability to execute a large number of I/O operations and perform automated storage management functions. The present invention includes a storage controller for controlling a storage system, the storage controller may include: a storage processor operable to process access requests to the storage system; a switching device controlled by the storage processor and operable to provide access to at least one storage device to at least one host device; a metadata cache memory operable to be accessed by the storage processor and operable to store virtualization tables to determine the memory address of stored information based on a virtual address of the stored information; and a block cache memory controlled by the storage processor and operable to store a predetermined set of information for rapid access by a host device through the switching device.

In the storage controller the host device may comprise a server, at least one storage device may include at least one disk drive array, and the switching device may be connected to at least one host device through at least one host channel processor. At least one host channel processor may be implemented through firmware. The switching device may be connected to at least one storage device through at least one storage device channel processor, which may be implemented through firmware.

In the storage controller the switching device may be comprised of an active switching system. The active switching system may include a HyperTransport data switch that is connected to at least one host device and at least one storage device through a HyperTransport bus. The switching device may be connected to at least one storage device through a fiber channel processor.

In the storage controller, the storage processor may collect information on disk access, usage, and failure and enable SRM and SAM functions, which may or may not have been previously specified by a policy external to the storage controller. In the storage controller the storage processor may provide many parallel high performance data paths for at least one of: fail over, making local copies and providing remote data copies. The storage processor may select the data read from a storage device among a plurality of storage devices that retrieves the data first, thereby minimizing the time to first byte.

In the storage controller, as volume or block data is spread across multiple storage devices, the storage processor may perform automated performance tuning, including at least one of: load balancing, and hot spot removal. The storage processor may use metadata to enforce secure access to storage at a block or a LUN level so that access rights may be enforced. The storage processor may also use metadata processing and channel processing for performing an automated fail over in case of storage device failure. The storage processor may also use metadata processing and storage device channel processing for performing at least one of: automated storage volume, block allocation, and dynamic expansion of storage volume for storage applications.

In the storage controller, the metadata cache memory and block cache memory may be independently scalable in size and performance to match system requirements. The metadata cache and block cache may be combined in a single unified memory or distributed over multiple coherent or non-coherent memories.

The storage controller may further include redundant storage processors connected to said storage processor through one or more switching devices.

An information storage system is also disclosed comprising: a storage controller having a metadata cache memory and a block cache memory and a switching device; at least one host channel processor which is operable to connect the storage controller to at least one server; and at least one storage channel processor which is operable to connect the storage controller to at least one storage device.

In the storage system at least one storage device includes at least one disk drive array. The switching device may be comprised of a HyperTransport data switch, which may be connected to the at least one host device and the at least one storage device through a HyperTransport bus. The switching device may be connected to at least one storage device through a Fibre Channel processor.

The storage controller of claim 1, wherein said switching device is connected to said at least one storage device through a serial protocol, including at least one of Hyper-Transport, Fibre Channel and InfiniBand protocols.

The invention also includes a method of operating a storage system having a storage controller comprising: a storage processor operable to process access requests to the storage system; a switching device controlled by said storage processor and operable to provide access of at least one storage device to at least one host device; a metadata cache memory operable to be accessed by said storage processor and operable to store virtualization tables to determine the memory address of stored information based on a virtual address of the stored information; and a block cache memory controlled by said storage processor and operable to store a predetermined set of information for rapid access to a host device through said switching device: the method may comprise the steps of: receiving an access request for access to the storage system from a server extracting at least one of a SCSI command, logical volume data and logical block address data in response to the access request; requesting a physical device address based on at least one of the logical volume data and the logical block address; providing instructions to the at least one storage device based on the access request to read or WRITE data; and receiving performance statistics from the at least one storage device indicative of the ability of the storage system to comply with the access request.

In the method of operating the storage system, when the access request is a WRITE request, the method may further comprise the steps of: determining if the storage device associated with the physical device address has sufficient space to store the specified data prior to the step of providing instructions to said at least one storage device; and writing the specified data in the storage device associated with the physical device address if sufficient space is available in response to the step of providing instructions to the at least one storage device. The method may further comprise the step of performing a volume expansion of the storage device associated with the physical device address if sufficient space is not available prior to the step of writing the specified data. The method may further comprise the steps of: determining if the performance of the step of writing specified data is below a threshold level; and reallocating the logical volume data to obtain improved performance.

In the method of operating the storage system, when the access request is a WRITE request, the method may further comprise the steps of: determining if data exists in the block cache memory that will satisfy the access request prior to the step of requesting a physical device address; and if data does not exist in the block cache memory that will satisfy the access request, reading the specified data from the storage device associated with the physical device address in response to the step of providing instructions to the at least one storage device. The method may further comprise the steps of: determining if the performance of the step of reading the specified data is below a threshold level; and reallocating the logical volume data to obtain improved performance.

In the method of operating the storage system, the performance statistics may include information on disk access, usage, and failure, and the method may further comprise the step of enabling SRM and SAM functions which may or may not have been previously specified by a policy external to the storage controller.

The method of operating the storage system, may further comprise the step of providing parallel high performance data paths for at least one of: fail over, making local copies and providing remote data copies. In the method of operating the storage system, when the access request is a read request, the method may further comprise the step of selecting data read from a storage device among a plurality of storage devices that retrieves the data first, thereby minimizing the time to first byte.

The method of operating the storage system may further comprise the step of performing automated performance tuning when volume or block data is spread across multiple storage devices, automated performance tuning, including at least one of: load balancing, and hot spot removal. The method of operating the storage system may further comprise the step of using metadata to enforce secure access to storage at a block or a LUN level so that access rights may be enforced. The method of operating the storage system may further comprise the step of using metadata processing and channel processing for performing an automated fail over in case of storage device failure. The method of operating the storage system may further comprise the step of using metadata processing and storage device channel processing for performing at least one of: automated storage volume, block allocation, and dynamic expansion of storage volume for storage applications.

The invention also includes a computer readable medium containing instructions to perform a method of operating a storage system having a storage controller comprising: a storage processor operable to process access requests to the storage system; a switching device controlled by said storage processor and operable to provide access to at least one storage device to at least one host device; a metadata cache memory operable to be accessed by said storage processor and operable to store virtualization tables to determine the memory address of stored information based on a virtual address of the stored information; and a block cache memory controlled by said storage processor and operable to store a predetermined set of information for rapid access by a host device through said switching device: the method may comprise the steps of: receiving an access request for access to the storage system from a server; extracting at least one of a SCSI command, logical volume data and logical block address data in response to said access request; requesting a physical device address based on at least one of the logical volume data and the logical block address; providing instructions to the at least one storage device based on the access request to read or WRITE data; and receiving performance statistics from the at least one storage device indicative of the ability of the storage system to comply with the access request.

In the computer readable medium, when the access request is a WRITE request, the method of operating the storage system may further comprise the steps of: determining if the storage device associated with the physical device address has sufficient space to store the specified data prior to the step of providing instructions to said at least one storage device; and writing the specified data in the storage device associated with the physical device address if sufficient space is available in response to the step of providing instructions to the at least one storage device. In the computer readable medium, the method may further comprise the step of performing a volume expansion of the storage device associated with the physical device address if sufficient space is not available prior to the step of writing the specified data. In the computer readable medium, the method may further comprise the steps of: determining if the performance of the step of writing specified data is below a threshold level; and reallocating the logical volume data to obtain improved performance.

In the computer readable medium, when the access request is a WRITE request, the method of operating the storage system may further comprise the steps of: determining if data exists in the block cache memory that will satisfy the access request prior to the step of requesting a physical device address; and if data does not exist in the block cache memory that will satisfy the access request, reading the specified data from the storage device associated with the physical device address in response to the step of providing instructions to the at least one storage device. In the computer readable medium, the method may further comprise the steps of: determining if the performance of the step of reading the specified data is below a threshold level; and reallocating the logical volume data to obtain improved performance.

In the computer readable medium, in the method of operating the storage system, the performance statistics may include information on disk access, usage, and failure and the method may further comprise the step of enabling SRM and SAM functions which may or may not have been previously specified by a policy external to the storage controller.

In the computer readable medium, the method of operating the storage system may further comprise the step of providing parallel high performance data paths for at least one of: fail over, making local copies and providing remote data copies. In the computer readable medium, when the access request is a read request, the method may further comprise the step of selecting data read from a storage device among a plurality of storage devices that retrieves the data first, thereby minimizing the time to first byte.

In the computer readable medium, the method of operating the storage system may further comprise the step of performing automated performance tuning when volume or block data is spread across multiple storage devices, automated performance tuning, including at least one of: load balancing, and hot spot removal. In the computer readable medium, the method of operating the storage system may further comprise the step of using metadata to enforce secure access to storage at a block or a LUN level so that access rights may be enforced. In the computer readable medium, the method of operating the storage system may further comprise the step of using metadata processing and channel processing for performing an automated fail over in case of storage device failure. In the computer readable medium, the method of operating the storage system may further comprise the step of using metadata processing and storage device channel processing for performing at least one of: automated storage volume, block allocation, and dynamic expansion of storage volume for storage applications.

BRIEF DESCRIPTION OF THE DRAWINGS

The accompanying drawings, which are incorporated in and form a part of the specification, illustrate exemplary embodiments of the present invention and, together with the description, serve to explain the principles of the invention. In the drawings:

FIG. 8 illustrates exemplary WRITE, Control, and READ operations of the hybrid centralized and distributed processing system of FIG. 6;

DETAILED DESCRIPTION OF THE INVENTION

Reference will now be made in detail to the present exemplary embodiments of the invention.

Figure 3:
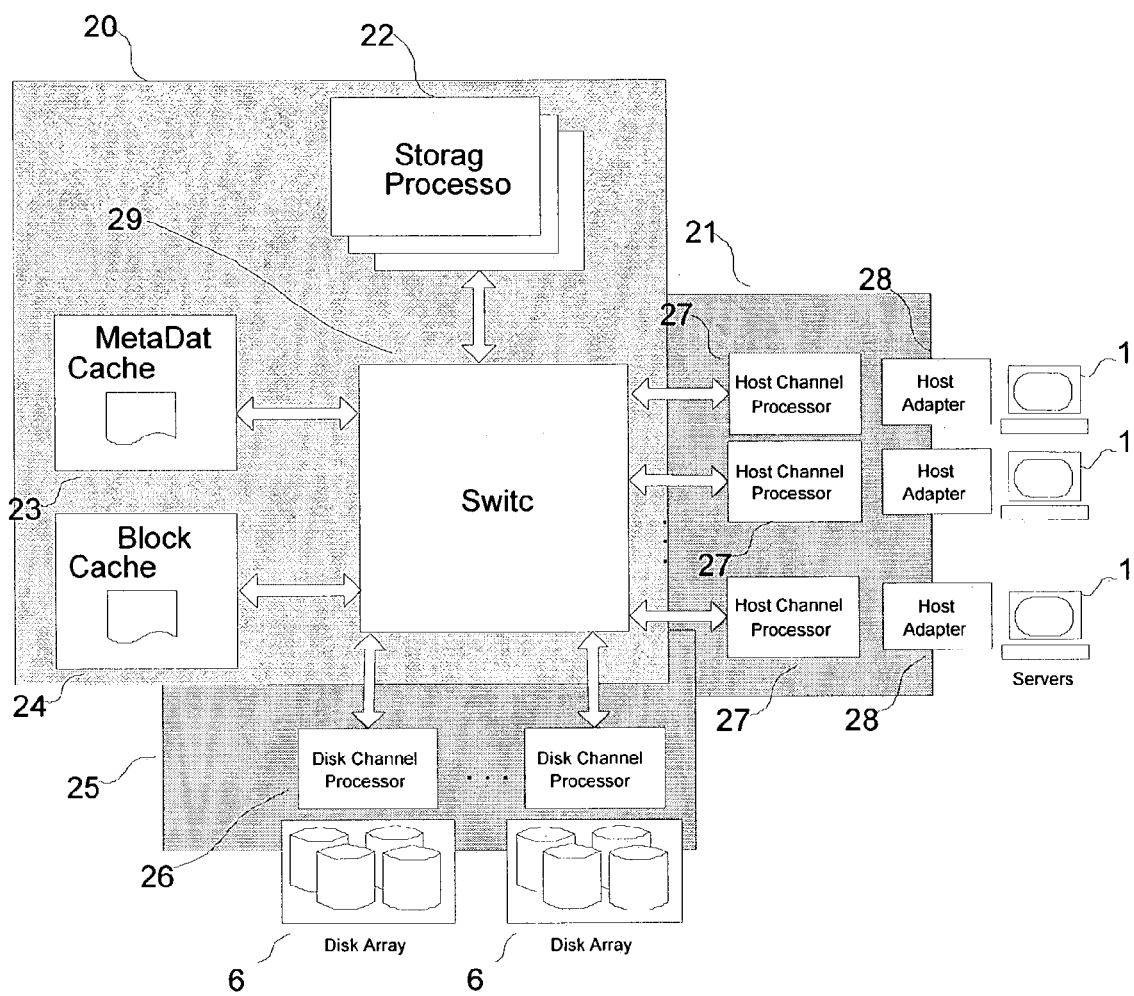
FIG. 3 illustrates a hybrid centralized and distributed processing system according to the present invention.

FIG. 3 illustrates a hybrid centralized and distributed processing system according to the present invention using an optimal hybrid mix of centralized and distributed processing. The centralized processing executes a single instance of the storage controller code. Typically, SMP (symmetric multiprocessing) CPUs are used to execute all storage processing but in a single location. Distributed disk channel (storage) processing is done close to the storage devices, in the form of distributed intelligent disk adapter processing, that executes both storage protocol processing as well as supporting specific storage management functions.

FIG. 3 illustrates how the central processing complex 20 operates with centralized cache modules 23 and 24 and works in conjunction with intelligent channel processors 21 and 25 for both protocol processing and data movement functions for access to storage devices 6 and host servers 1. As illustrated in FIG. 3, a central processing complex 20 communicates with a plurality of host channel processors 27 associated with a plurality of host adapters 28, which are associated with a plurality of servers 1. As also illustrated in FIG. 3, central processing complex communicates with a plurality of disk arrays 6 through a plurality of disk channel processors 26. The disk arrays 6 may be comprised of a plurality of optical or magnetic disk drives, each disk drive may contain a plurality of disks. Each channel processor may be configured through firmware to be either a target device (host interface) or an initiator device (storage device interface).

The central processing complex 20, as illustrated in FIG. 3, contains a metadata cache memory 23 and a block cache memory 24. The metadata cache memory 23 and the block cache memory 24 can be any type of known memory devices, such as semiconductor RAM devices (DRAM, EDORAM, SRAM, etc.), magnetic disk devices, or rewritable optical disk devices. The storage processor(s) 22, located in the central processing complex 20 controls the access to metadata cache memory 23 and block cache memory 24 through switch 29.

Although the system of FIG. 3 is mainly discussed with reference to a single storage processor for the sake of a simplified discussion of the invention, the design illustrated in FIG. 3 allows for multiple storage processors as shown in exemplary embodiments in FIGS. 5 and 6. Redundant storage controller systems can be interconnected through one or more switch ports in multiple different topologies. Metadata and block data can be mirrored across the high-speed ports in an active-active or active-passive configuration to provide higher reliability and availability.

The use of a metadata cache memory 23 and block data cache memory 24 as two modules ensures that multiple storage requests can be processed concurrently at different stages of processing. For example, metadata of a storage I/O request can be processed concurrently with block data retrieval from cache for a different storage I/O request. This increases the number of I/O operations that can be executed concurrently, thereby increasing performance.

The metadata cache and block cache are independently scalable in size and performance to match system requirements. The metadata cache and block cache may be combined in a single unified memory or distributed over multiple coherent or non-coherent memories.

Figure 1:
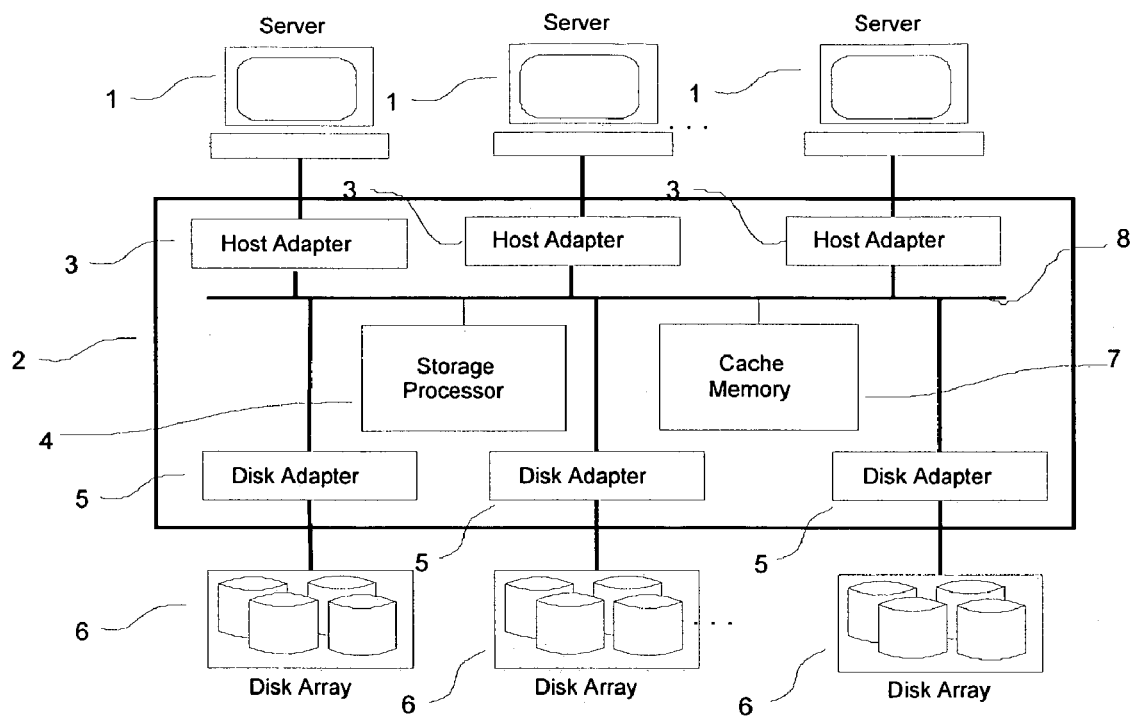
FIG. 1 illustrates a Prior Art Centralized Storage Controller.
Figure 2:
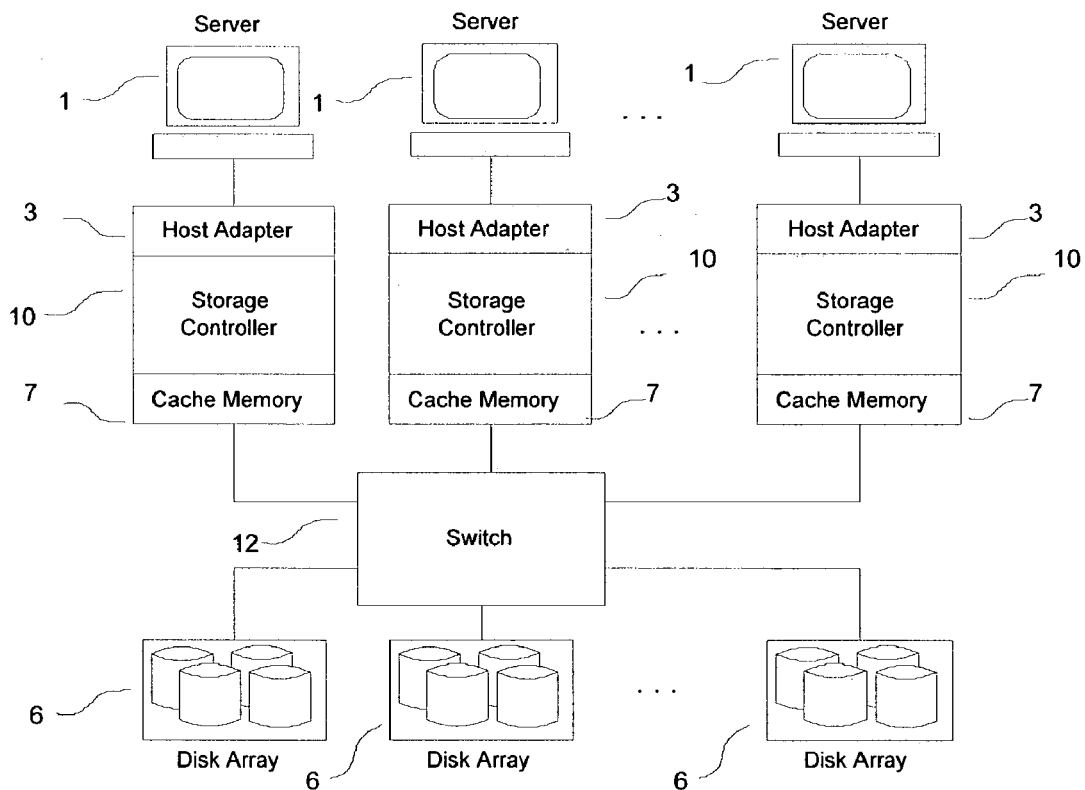
FIG. 2 illustrates a Prior Art Distributed Storage Controller with Cache Memories.

For purposes of data bandwidth, the storage processor 22 represents a plurality of storage processors. The cache modules are connected to the storage processors 22 via switch 29, which is a non-blocking switched interconnect. Switch 29 can be any known type of switching device. Switch 29 also connects storage processors 22 to disk channel processors 26 for access to disk arrays 6 as well as to hosts channel processors 27 for access to host adapters 28 and servers 1. The switch 29 enables data movement, metadata movement and inter-processor communications to occur simultaneously and independently. This approach provides scalable data paths and a data I/O rate that is similar to a distributed storage controller approach illustrated in FIG. 2.

The disk channel processors 26 may be the same type of processor as the host channel processors 27, and, in a preferred embodiment, a single channel processor may be configured as a host channel processor 27 or as a disk channel processor 26. Both the host channel processors 27 and the disk channel processors 26 preferably perform all low-level data movement functions under the command and control of the storage processors 22, including all connectivity protocol processing, such as for Fibre Channel, SCSI or iSCSI. Low-level data movement operations may be used for parallel data READ and WRITE between the disk channel processors 26 and the disk arrays 6. The storage controller works with any high-speed active switching device such as: HyperTransport switching, Fibre Channel, Infiniband, or PCI_Express.

The high-speed metadata cache may be used for multiple purposes. Metadata is stored for multiple aspects of the logical storage units, typically a volume or logical unit number (LUN). Much of the metadata that is used for storage management, e.g., automated volume expansion, fail-over in the case of storage device failures, performance tuning in the case of unexpected changes in workload, creating copies of data for purpose of data availability may be dictated by the SRM and SAM functional units. In the most general case, the SRM and SAM policies may be set external to the storage system since the SRM and SAM policies may dictate storage policies for all storage systems, networked or direct-attached, in the data center.

At a volume or LUN level as well as block level, metadata is maintained and collected on multiple aspects of the storage system, such as virtualization tables, security rights of access to stored information, a percentage of physical storage utilized by the storage of the information, the access pattern history, and the current performance record of the storage system. Virtualization Tables include a logical volume to physical block address (PBA) mappings across all disks attached to the system. Thus, access to any storage requested by the host may be managed in a manner that is transparent to the host through the virtualization table, stored in the metadata cache, and through the processing of the storage processor. If the physical storage blocks have to be relocated to a different location behind the switch 29 in response to a failure of a disk (storage device), then the host adapter 28 may not be affected since the logical block address (LBA), presented to the host adapter 28 for the LUN access, does not have to be changed, but just the mapping in the metadata is changed. The same transparency may also be possible through changes in the mapping when the physical storage has to be changed to improve performance from host adapter 28 to physical storage.

Security rights from host to LUN or LBA may include access rights of any particular host to any logical or physical storage device and may be stored in the metadata. Real-time and secure access to any storage device can therefore be controlled. The metadata may be used to enforce secure access to storage at block or LUN levels so that access rights can be enforced, e.g., the access rights define which hosts are allowed access to what storage entity and for what operations. Accordingly, the storage processor 22 may use the metadata processing to enforce a storage access security policy in the data path for storage volume or block or application specific data access.

The statistic of the percentage of physical storage utilized is maintained for each physical storage unit to estimate both utilization of capacity and access. It can be used to later to make decisions on reconfiguring or reallocating storage. The access pattern history of the LBAs by hosts and/or applications statistic may be used to determine potential reconfiguration, as well as to track storage usage by user, possibly to determine an appropriate charge to the application (server). The current performance record of the LBA may be inferred or observed at the disk channel and from the host adapter level. The current performance record statistic may be used to determine bottlenecks or delays and for deciding load balancing and reconfiguration decisions.

Metadata processing and storage device channel processing may be used for doing automated performance tuning, such as load balancing, hot spot removal, etc., as volume or block data is spread across multiple storage devices. Metadata processing and storage device channel processing may also be used for performing automated storage volume or block allocation and dynamic expansion of storage volume for storage applications. Metadata processing and channel processing may also be used for performing automated fail over in case of storage device failure. This provides for fault-tolerant access to data and built-in data availability.

Metadata changes are typically made during allocation or reallocation of storage to hosts at a block level and logical volume level. The granularity of information on, and the number of storage units, whether volumes or blocks, is limited only by the total size of metadata cache.

Other metadata changes may be effected by data collected at the host channel processors 27 or the disk channel processors 26 on usage and access and performance of access of storage from host adapter 28 to the disk arrays 6. The operational metadata may then be used to perform SRM planning and SAM execution.

Intelligent storage device channel processing may be used to collect information on disk access, usage, failure, etc. to enable SRM and SAM functions that may or may not be specified by policy external to the storage system. Intelligent storage device channel processing that provides parallel high performance data paths for fail over, local copies and remote data copies may be achieved. For availability, the system can, by policy, create local or remote copies using parallel paths initiated by and in the device channel processors. Intelligent storage device channel processing may also provide faster access to data by selecting the data read from the storage device that retrieves its data the earliest, thereby minimizing the time to first byte improving access performance.

Figure 4A:
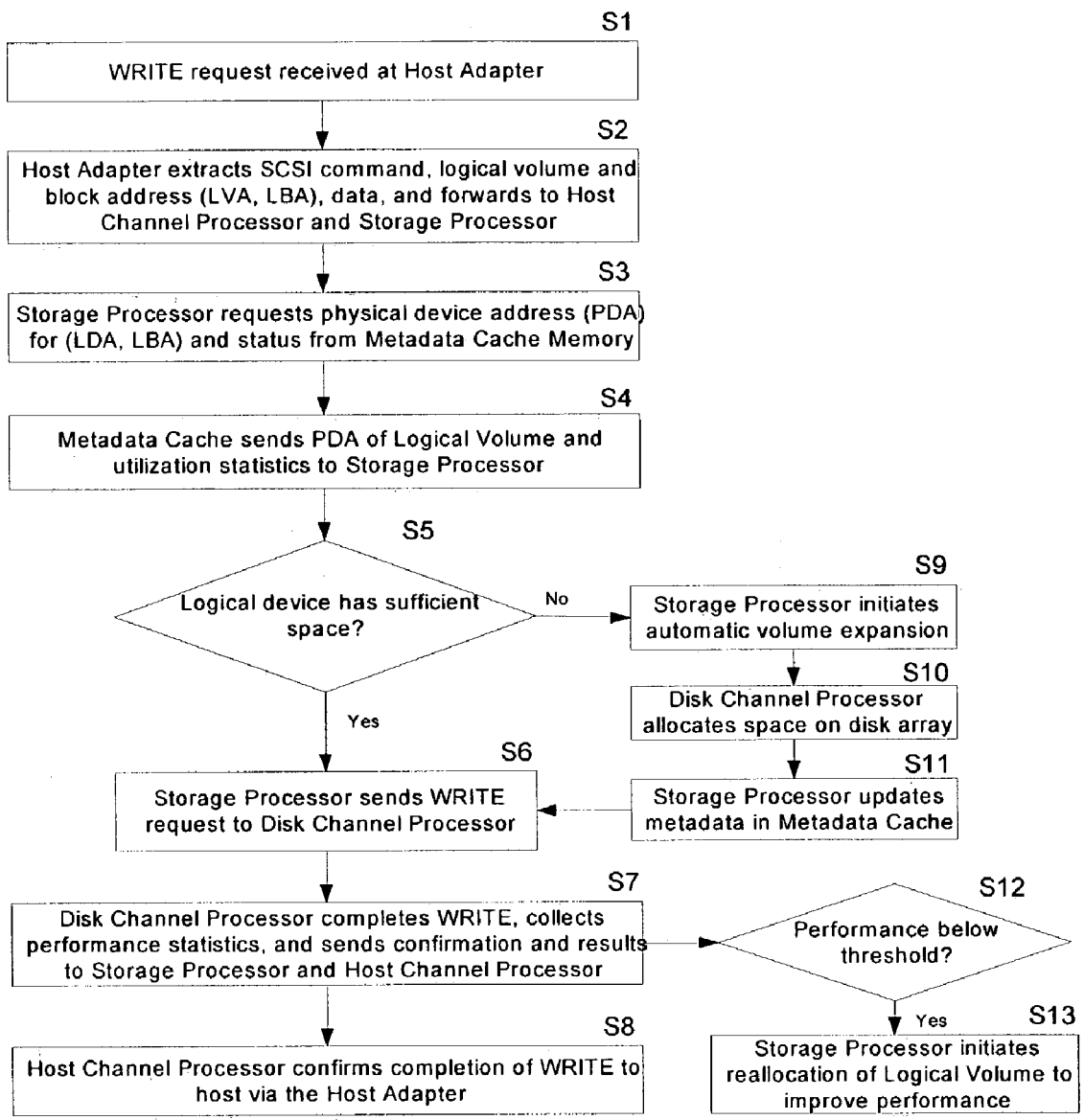
FIGS. 4A and 4B illustrate exemplary WRITE and Read operations of the hybrid centralized and distributed processing system of FIG. 3.
Figure 4B:
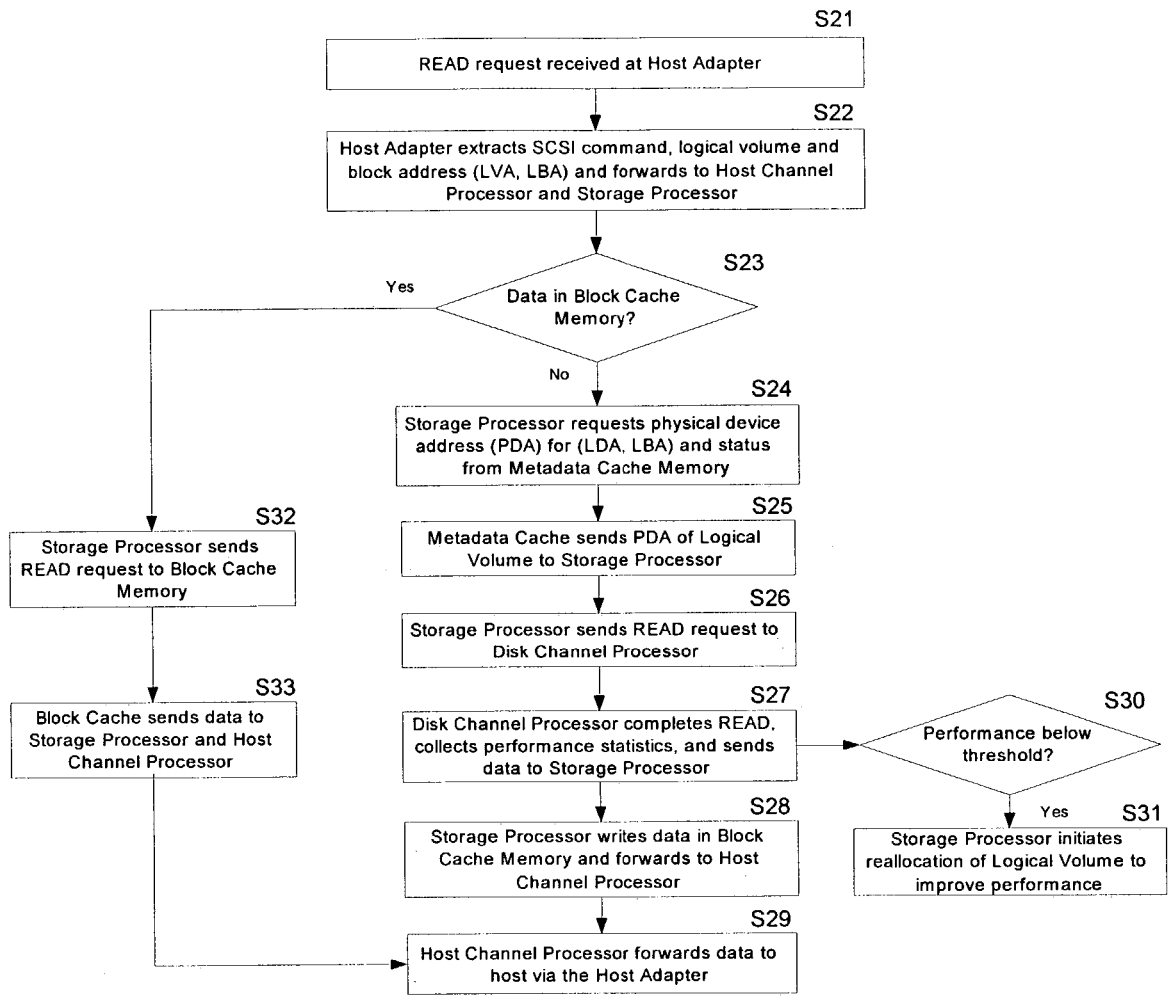

To illustrate how the system, depicted in FIG. 3, may be used efficiently to perform different storage operations, an exemplary process for a typical WRITE operation is illustrated in FIG. 4A and an exemplary process for a typical READ operation is illustrated in FIG. 4B.

We refer to FIGS. 3 and 4a, for the identification of the different functional components.

As illustrated by step S1 in FIG. 4A, a WRITE request is received at the host adapter (HA) 28 via a specific protocol such as Fibre Channel. As illustrated by step S2, the host adapter extracts the SCSI command request (in this case WRITE), the requested target logical volume (device) address and block address (LVA, LBA) from the payload and forwards the request with parameters to the host channel processor 27 as well as the storage processor 22. Since the mapping of the logical volume to physical device and address mappings are kept in the metadata cache memory 23, in step S3 the storage processor requests physical device address (PDA) for the target device from the metadata cache 23. The storage processor also requests the status of the requested storage device and its utilization (load). The metadata cache 23 sends the PDA and the utilization of the logical volume or storage device to the storage processor, as illustrated in step S4.

If the logical volume does have enough space, i.e., if the target device utilization is below a preset threshold, the storage processor sends the WRITE request to the target physical storage device and LBA via the appropriate disk channel processor (DCP) 26 using a connection through the switch 29, as illustrated in steps S5 (Yes) and S6. If the target device does not have enough space (step S5 (No)), then the storage processor initiates an automatic volume expansion (step S9) and sends the request to allocate the requested WRITE space to the appropriate DCP (step S10), which the storage processor knows has disks with available space, as illustrated in steps S5 (No) and S9. When the DCP allocates the requested WRITE (step S10), the storage processor updates the logical to physical volume and address mappings and updates the information in the metadata cache 23, as illustrated in step S11. The storage processor then resends the requested WRITE to the DCP.

When the DCP completes the WRITE operation, it sends a confirmation of completion to the storage processor and the host channel processor, which notifies the host via the host adapter 28. Also, during the I/O operation, DCP 26 preferably collects statistics on the (data rate) performance of the WRITE process and sends it to storage processor 22. If the WRITE performance is lower than the expected mean performance by more than preset threshold, then storage processor 22 preferably initiates a reallocation of current logical volume onto different physical devices. After the reallocation is completed using the DCPs 26 chosen by the storage processor 22, the storage processor 22 preferably updates the metadata cache 23.

As illustrated in step S21 of FIG. 4B, the READ I/O request is received at the host adapter 28. The host adapter 28 extracts SCSI command request (in this case READ), the requested target logical volume (device) address and block address (LVA, LBA) from the payload and forwards the request with parameters to the host channel processor 27 as well as the storage processor 22, as illustrated in step S22. The storage processor 22 checks the block cache memory 24 to verify if the data to be read is cached, as illustrated in step S23. If the requested data is in the block cache memory 24 (step S23, Yes and step S32), then the storage processor 22 sends the data to the host channel processor 27 (step S33), which then forwards the data to the requesting host via the host adapter (step S29). If the requested data is not cached in the block cache memory 24 (step S23, No), then the storage processor 22 requests the physical device address (PDA, i.e., the map of logical data address (LDA) to the physical data address (PDA)) for the target READ device (e.g. a disk drive) from the metadata cache 23, as illustrated in step S24. The metadata cache 23 preferably responds with the PDA to the storage processor 22, as illustrated in step S25.

As illustrated in step S26, the storage processor 22 sends the READ request to the target LDA, LBA to the appropriate disk channel processor 26 using a connection on the switch 29. The disk channel processor 26 then retrieves the first block of data from whichever disk in the array 6 retrieves the data first and assembles the data to send to the host channel processor 26 via the switch 29, to minimize the time to first byte.

The disk channel processor 26 completes the READ and sends the confirmation of completion to the storage processor and the host channel processor, as illustrated in step S27. While executing the READ, the DCP collects performance statistics on data rate and latency and sends it to the storage processor, also illustrated in step S27.

If the READ performance is lower than the expected mean by more than a preset threshold (step S30), then the storage processor 22 initiates a reallocation of current logical volume onto different physical devices (step S31). After the reallocation is completed using the DCPs 26 chosen by the storage processor 22, the storage processor 22 updates the metadata cache 23.

If the requested READ data was not cached in the block data cache 24, the storage processor updates the block data cache 24, applying the predefined cache replacement scheme, as illustrated in step S28. The requested READ data is forwarded from the host channel processor 27 to the host adapter 28 to be provided to a server 1.

A number of techniques may be used to improve IOPs performance. Parallel cache data paths may be used so that separate metadata and data cache modules may be used each with its own path to the switch. All cache data, either block data or metadata cache modules, may be centralized so there is no cache synchronization penalty either in metadata updates or block data caching for temporal locality. Where possible logical block data can be spread across multiple disks or disk arrays which provides for more data parallelism as well as high bandwidth since a single block read via the disk channel processor can aggregate block from multiple disks (disk arrays). Spreading data across multiple disks also allows more fail-over possibilities.

Multi-channel data movement and copying may also be used to improve the IOPs performance. Because channel processors can address multiple disks or disk arrays, when creating a second copy of data, multiple channel processors can collaborate to move data across multiple parallel data paths. Whether a local copy or remote copy is being created for a storage volume, multiple channel processors can move data in parallel to read, transfer and write from P drives to another P drives. Thus, the data rate for the data copy is P-times the bandwidth achievable from a disk drive. The control of such parallel data movement may be through the storage processors.

Short time to first byte may also be a technique to improve the IOPs performance. With intelligent channel processors and logical block data spread across multiple disks, the probability of shortening time to first byte improves. This is because during the block READ process when multiple disks are spun up at the same time, the time to first byte is determined by the disk that has the lowest seek time. The probability of lower seek times increases with the number of disks accessed concurrently. Intelligence in the disk channel processor can therefore coordinate scatter and gather processes to assemble the complete block data from the data read from multiple disks.

Reallocation of storage to improve performance may be used to improve the IOPs performance. Because a number of access statistics are collected by the channel processors, the channel processors under control of the storage processor can determine if and when access times exceed a preset threshold. In the event that access times are higher than expected, the channel processors can copy and migrate data to different locations (disks) using the load-balancing and reallocation schemes determined to be most suitable.

The hybrid central and distributed processing architecture illustrated in FIG. 3 has several advantages. One advantage is the collapsing of multiple storage management functions and layers into a unified and efficient structure. This allows for operating on multi-dimensional centralized metadata to collect storage operation statistics, such as virtualization tables, usage access of logical and physical storage, historical and current performance, etc., to perform SRM planning and SAM execution as collapsed functions. SRM and SAM functions can be automated by policy by the storage processing. This also allows execution on SAM functions by using parallel data movement operations in the distributed disk channel processing at the level of storage devices based on storage operational metadata.

Another advantage is improved storage IOPs performance through techniques to optimize the use and processing of metadata, such as using separate metadata and block data paths, and separate metadata and block data caches. However, through central processing of all metadata, cache synchronization penalties can be avoided.

Another advantage is that the architecture allows the acceleration of data movement functions for data availability, performance tuning, and fail-over functions in support of SAM and SRM. Multiple data paths of the intelligent (disk) channel processors may be used to allow parallel channels of data movement between storage arrays/devices for both fail over and creating local secondary copies of data. The architecture also allows the use of multiple data paths to create higher performance remote copy of data for disaster recovery.

Figure 5:
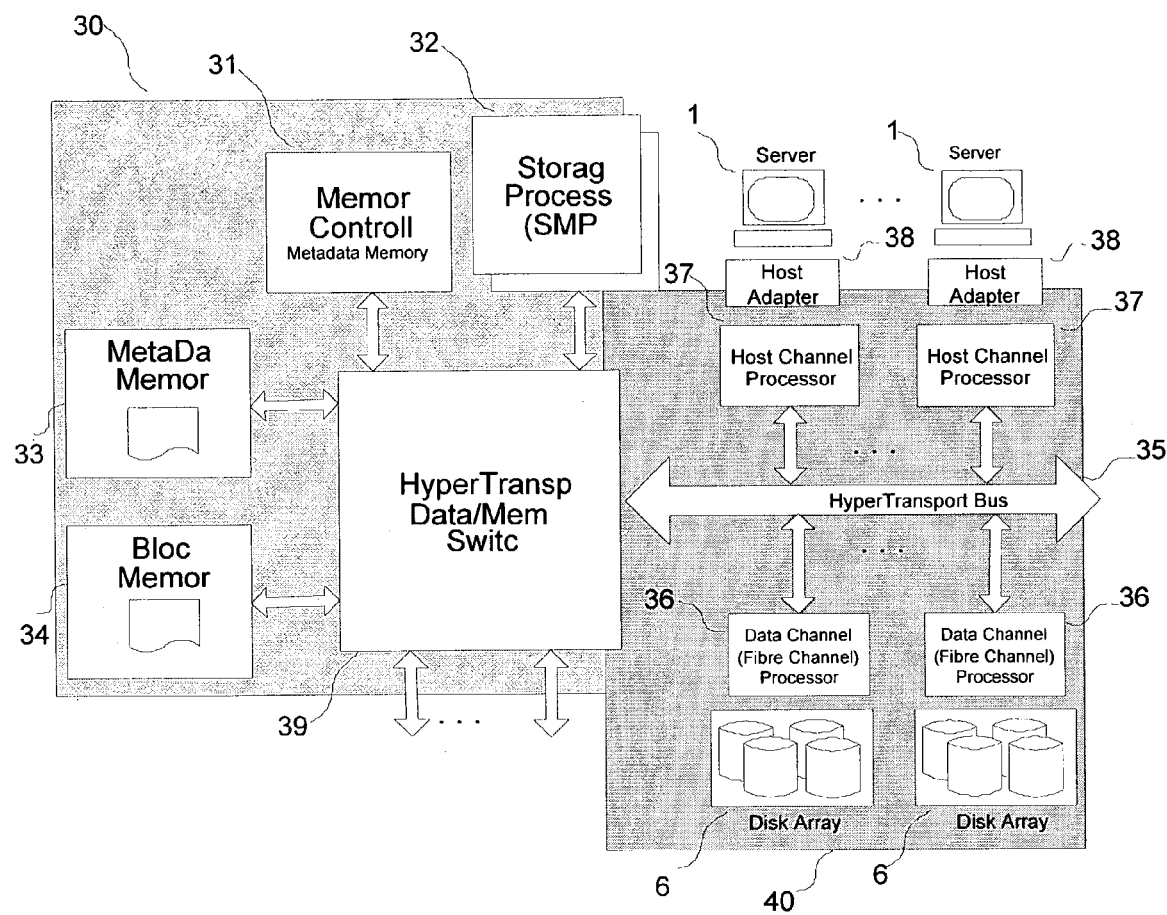
FIG. 5 illustrates an implementation of the hybrid centralized and distributed processing system of FIG. 3 using HyperTransport Switch and Busses.

In terms of a practical implementation, FIG. 5 shows using a HyperTransport (HT) switch and high-bandwidth HT busses to interconnect the processing, cache and disk channel processing. Note that while a switched interconnection such as HT has been shown, any board-level switched interconnection schemes such as InfiniBand (IB), PCI-Express, or future variations can be used.

FIG. 5 illustrates the use of a HT switch 39 and HT bus 35 with the general architecture of FIG. 3. The embodiment of FIG. 4 also illustrates a separate memory controller 31 for controlling the metadata memory 33, and a storage processor (SMP) 32. Block memory 34 is similar to block memory 24, and metadata cache memory 23 is similar to metadata memory 33. Host channel processors 37 are connected to HT bus 35 and are similar to host channel processors 27. Data channel processors 36 are also connected to HT bus 35 and are similar to disk channel processors 26. Host adapters 38 are similar to the host adapters 28 in FIG. 3 and serve to connect servers 1 to host channel processor 37. The switch 39 is preferably a HT data/memory switch.

Switch 39 and the HT bus 35 provide a switched interconnection that allows redundant storage controllers 30 to be interconnected through one or more switch ports in different topologies. Metadata and block data can then be mirrored across the high-speed ports in an active-active or active-passive configuration to provide higher reliability and availability.

Figure 6:
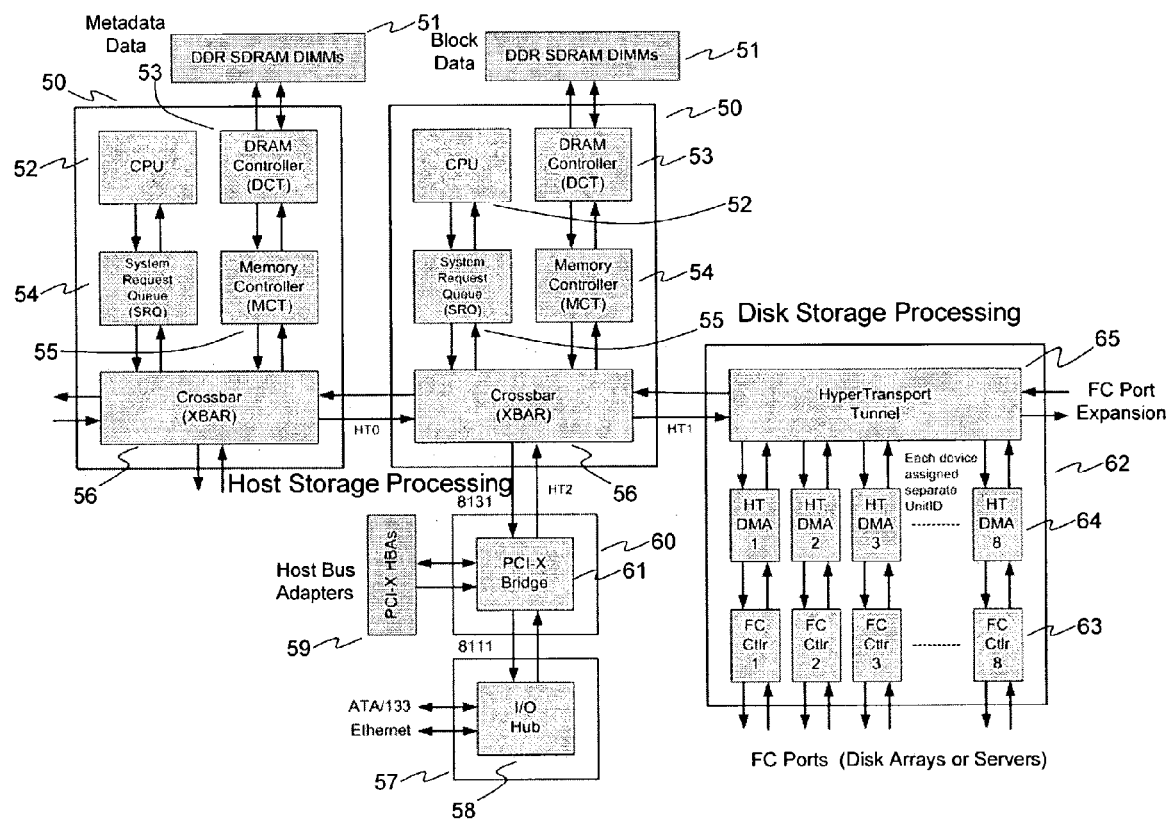
FIG. 6 illustrates an exemplary implementation of the hybrid centralized and distributed processing system of FIG. 3 using dual processors for Host Storage Processing, and a Disk Storage Processing unit on a HyperTransport Bus.

FIG. 6 illustrates a preferred implementation using two storage processors 50, two DDR SDRAM cache memories 51 for each of metadata and block caches, a HT crossbar switch and tunnel to disk channel processors, eight disk channel processors attached to the switch via HT tunnel, with Fibre Channel connectivity for disks or hosts, and PCI-X bridges may be used to attach separate RAID controllers and other network connections.

FIGS. 7 and 8A–8C illustrate how typical storage commands may be executed in the implementation shown in FIG. 6. In this discussion of the flowcharts illustrated in FIGS. 7 and 8A–8C, in the example described below, it is assumed that the host is connected to Fibre Channel (FC) controller #1 63 and disks are connected to FC controller #8 63. Host READ and WRITE operations may involve multiple FC controllers 63 on the disk side.

The flow described herein is a distributed processing approach whereby the central processor 52 is aided by HT 1 DMA controllers 64 and FC controllers 63 to move data and commands between the ports and Block Data Memory 51 with minimal intervention by the processor 52. The processor and controllers interact through queues in memory and interrupts. The FC controllers may be implemented using functional blocks from LSI Logic Corporation's Merlin®3 Fibre Channel (FC) core family.

Figure 7:
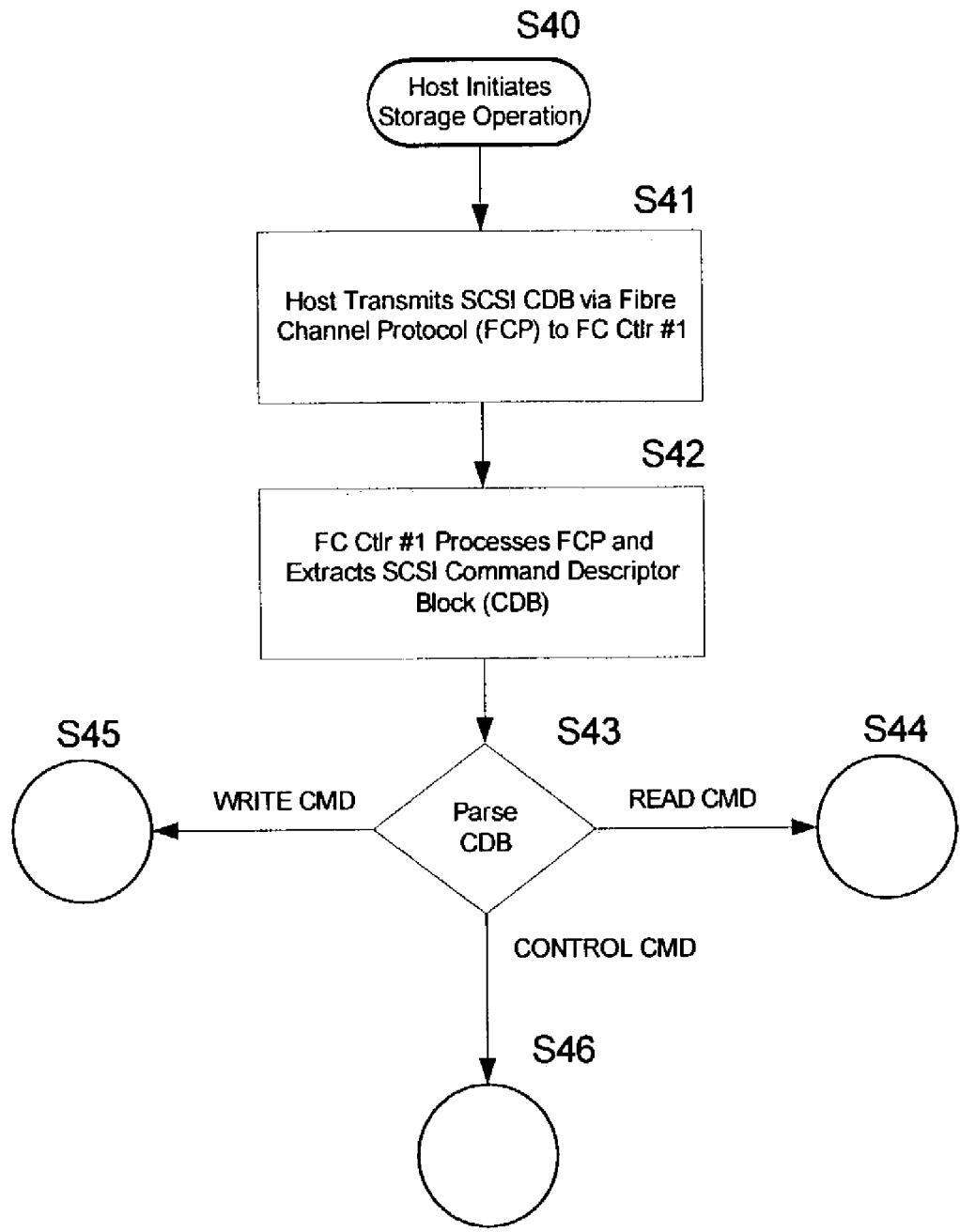
FIG. 7 illustrates an exemplary operation of the hybrid centralized and distributed processing system of FIG. 6.

As illustrated in FIG. 7, the host preferably initiates a storage operation (Step S40) by transmitting a SCSI Command Descriptor Block (CDB) via Fibre Channel Protocol (FCP) to Fibre Channel controller #1 63. FC controller #1 63 preferably processes the FCP stack, extracts the SCSI CDB (Step S42), and parses the CDB (Step S43) as a WRITE command (Step S45), a READ command (Step S44) or a CONTROL COMMAND (Step S46).

If the SCSI CDB contains a WRITE Command the process illustrated in FIG. 8A may be performed. As illustrated by step S51 of FIG. 8A, the HT DMA controller #1 64 transfers the SCSI CDB from the local data buffer to a WRITE Queue in Block Data Memory 51 via the HT bus HT1. The packet data is switched via the Crossbar (XBAR) 56 to the Memory Controller.(MCT) 54. The MCT 54 buffers and decodes the packet(s) and transfers the data to the DRAM Controller (DCT) 53. The DCT writes the data to DDR SDRAM 51 containing the Block Data Memory.

As illustrated in step S51, the FC controller #1 63 sends a SCSI XFER_RDY command to the host and initiates data transfer from the host to a local data buffer. The HT DMA controller #1 64 transfers SCSI data from the local data buffer to a pre-allocated WRITE queue in block data memory 51 via the HT bus HT1, as illustrated in step S52. As illustrated in step S53, the processor 52 takes the SCSI CDB off the WRITE queue, parses the CDB, and translates the Virtual SCSI Logical Block Address (LBA) to a Physical LBA. As shown in step S54, the processor 52 spawns a physical address WRITE Request (or multiple WRITE Requests), queues the SCSI CDB(s) in Block Data Memory 51, and interrupts the HT DMA controller #8 64 to retrieve the WRITE request(s). The HT DMA controller #8 64 transfers SCSI WRITE CDB(s) and associated data from Block Data Memory 51 to a local data buffer via HT bus HT1, as shown in step S55.

FC controller #8 63 sends the SCSI WRITE CDB to disk, waits for XFER_RDY from disk, sends data to disk, and waits for completion RSP from disk, as illustrated in step S56. FC controller #8 63 transfers a WRITE acknowledgment to the STATUS Queue in Block Data Memory 51 via HT DMA controller #8 64 and HT bus HT1, as illustrated in step S57. Then the processor 52 pops the WRITE acknowledgement(s) of the STATUS queue and sends a collective WRITE acknowledgment to FC controller #1 63 via HT bus HT1, as illustrated in step S58. The FC controller #1 63 sends a SCSI RSP to the host and acknowledges the WRITE data transfer from the host, as illustrated in step S59, and the host completes the storage operation as shown in step S60.

If the SCSI CDB contains a CONTROL or STATUS command the process illustrated in FIG. 8B may be performed. As illustrated in step S61 of FIG. 8B, the FC controller #1 63 processes the Control or Status Command if possible, and forwards remaining commands to the CMD Queue in Block Data Memory 51 via HT bus HT1 for processing by the processor 52. Then the FC controller #1 63 generates a SCSI RSP to the host, or forwards a SCSI RSP from the processor 52 to the host, as illustrated in step S62. The host then completes the storage operation, as illustrated in step S63.

If the SCSI CDB contains a READ Command the process in FIG. 8C may be executed. As illustrated in step S64 of FIG. 8C, the HT DMA controller #1 64 transfers the SCSI CDB from the local data buffer to the READ Queue in Block Data Memory 51 via HT bus HT1. Then as illustrated in step S65, the processor 52 pops the SCSI CDB off the READ Queue, parses the CDB, and translates the Virtual SCSI Logical Block Address (LBA) to a Physical LBA. The processor 52 then spawns a physical READ request (or multiple requests), queues SCSI CDB(s) in Block Data Memory 51, and interrupts the HT DMA controller #8 64 to retrieve the READ Request(s), as illustrated in step S66.

As illustrated in step S67, the HT DMA controller #8 64 transfers the SCSI READ CDB(s) to the local data buffer via the HT bus HT1. The FC controller #8 63 sends SCSI READ CDB(s) to disk(s) and receives data from disk(s) in the local data buffer, as illustrated in step S68. The HT DMA controller #8 64 transfers data from the local data buffer to Block Data Memory 51 via the HT bus HT1, as illustrated in step S69. Then the HT DMA controller #1 64 transfers data from Block Data Memory 51 to the Local data buffer via the HT bus HT1, as illustrated in step S70. The FC controller #1 63 transmits data to the host and then sends a SCSI RSP to the host, if requested by the host, as illustrated in step S71, and the host completes the storage operation, as illustrated in step S72.

As indicated earlier, storage channel processor hardware can be used to perform a variety of functions, including: i)

processing storage interconnect protocol such as Fibre Channel, iSCSI, Infiniband, among others; ii) providing parallel data movement paths; and iii) allowing local processing, besides protocol processing, for making decisions on caching close to disk, analyzing storage I/O performance, detection disk failures or precursors to failures, etc.

Figure 9:
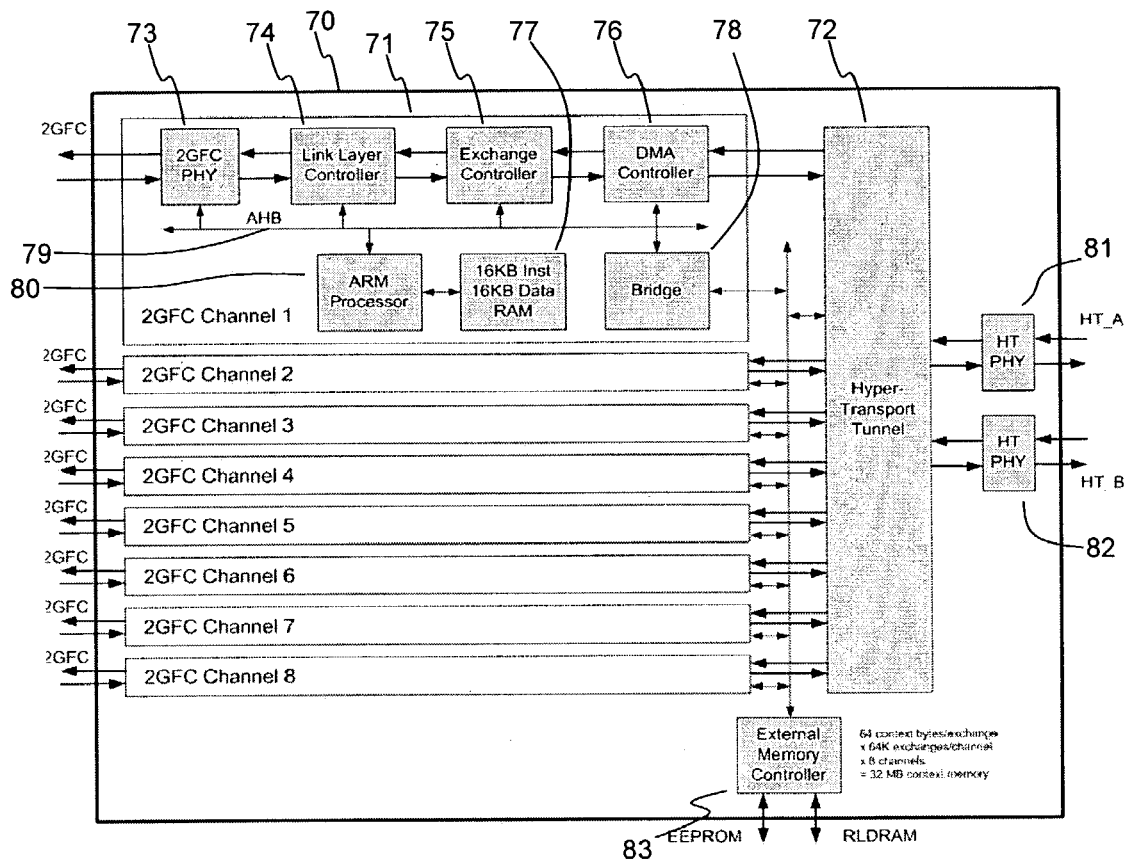
FIG. 9 shows an example implementation of a simple 8 way Fibre Channel disk channel processor.

FIG. 9 shows an example implementation of a simple 8 way Fibre Channel disk channel processor. In FIG. 9, the Disk Channel Processing Unit 70 provides eight FC ports 71 of integrated Fibre Channel controllers 73, 74, and 75 and DMA controller 76 sharing a common high-performance HyperTransport tunnel-mode interface 72A. As illustrated in FIG. 9, bus AHB 79 connects the FC controller 73, 74 and 75 and DMA controllers 76 to ARM processes 80. ARM processor 80 may be connected to RAM 77 which may be capable of containing 16 KB of instructions and 16 KB of data. HyperTransport tunnel-mode interface 72 may be connected to HyperTransport controllers 81 and 82. The Disk Channel Processing Unit 70 may also contain an external memory controller 83 to control a bus between HyperTransport tunnel 72 and FC ports 71. The unit 70 is designed for minimal control and interaction with the central processor 52 to minimize processing overhead.

Figure 10:
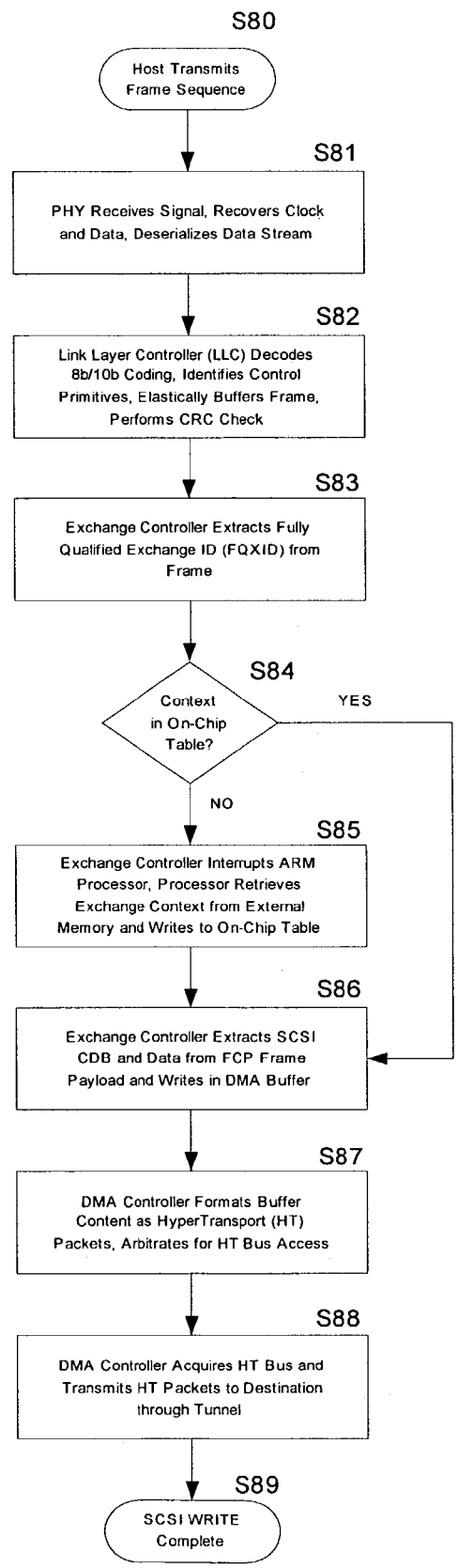
FIG. 10 illustrates a typical operation of the implementation of FIG. 9.

FIG. 10 illustrates a typical operation of the implementation of FIG. 9. In the flow diagram of FIG. 10, as illustrated by step S80, the host preferably transmits a frame sequence containing a SCSI WRITE CDB followed by data bytes to one of the FC ports 71. The FC PHY 73 receives the signal, recovers the clock and data, and de-serializes the data stream to form 10-bit words, as illustrated in step S81. As illustrated in step S82, the Link Layer Controller (LLC) 74 preferably decodes the 10-bit words, encoded with 8b/10b coding, identifies control primitives, such as Start of Frame (SoF) and End of Frame (EoF), which delineate the frame or indicate an idle or error condition, elastically buffers the frame to account for minor differences in transmit and receive clock frequencies, and performs a frame CRC check to verify frame integrity. Then the Exchange Controller 75 preferably extracts the Fully Qualified Exchange ID. (FQXID) from the frame header, as illustrated in step S83.

As illustrated in step S84, the FQXID is used to look-up the context associated with the received frame sequence. If the context is not found in the on-chip context table (NO in step S84), then the Exchange Controller 75 interrupts the on-chip ARM processor 80 and the processor 80 retrieves exchange context from external memory via the AHB Bridge 78 and External Memory Controller 83, and writes the context into the on-chip exchange context table integrated into the Exchange Controller 75, as illustrated in step S85. Then, as illustrated in step S86, the Exchange Controller 75 preferably extracts the SCSI CDB and data from the frame payload (the frame format is specified by the Fibre Channel Protocol—FCP) and writes the CDB and data in the DMA controller's 76 buffer. If the context is found in the on-chip context table (YES in step S84), then the process proceeds directly to step S86.

The DMA controller 76 preferably formats the buffer content as one or more HT packets and arbitrates for HT bus access with HyperTransport Tunnel Controller 72, as illustrated in step S87. Once granted access to the HT bus by the Tunnel Controller 72, the DMA controller 76 preferably transmits the HT packets to the destination address specified in the packets, as illustrated in step S88. The SCSI WRITE operation then completes, as illustrated in step S89.

Figure 11:
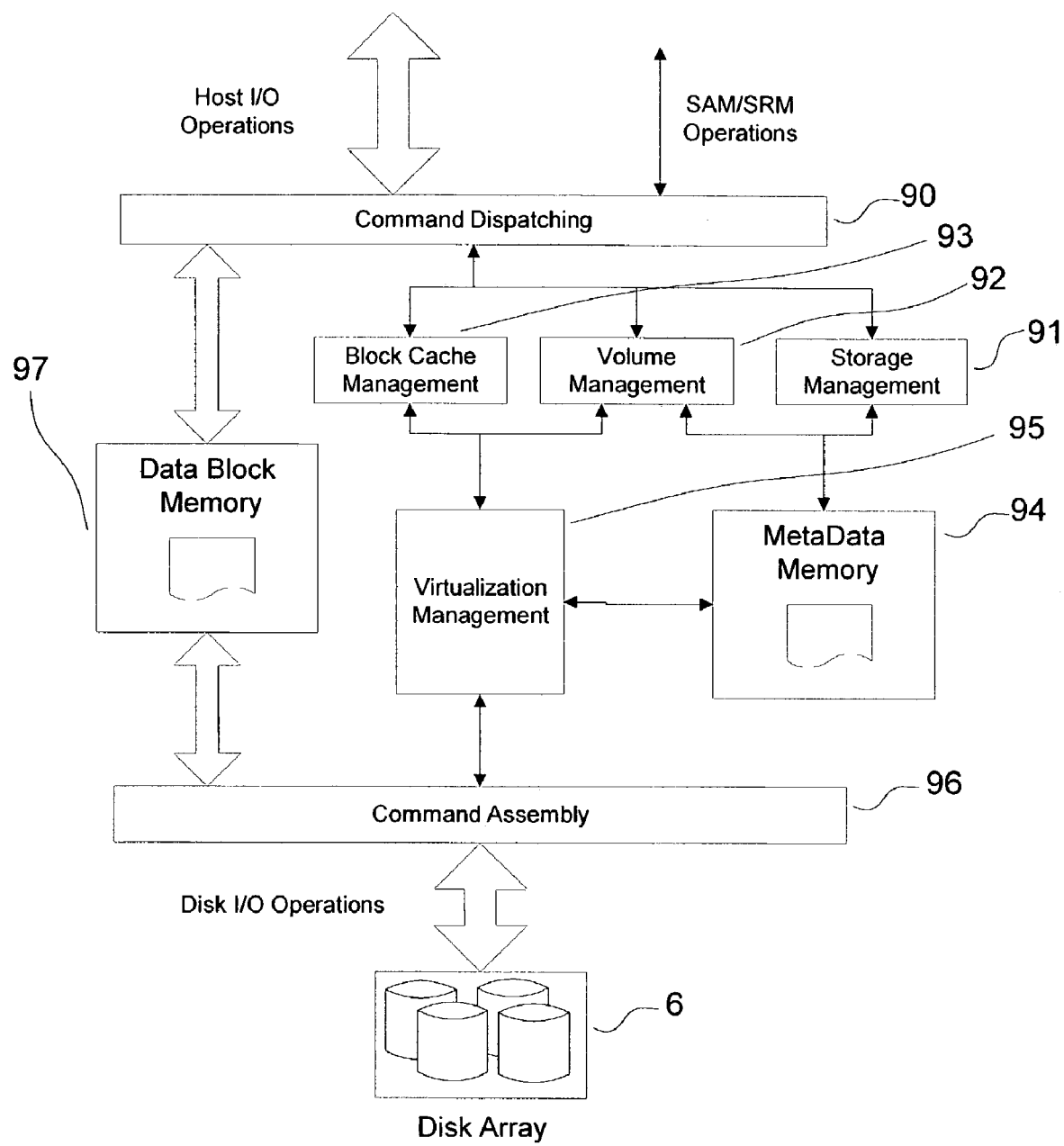
FIGS. 11 and 12 illustrate an exemplary sequence of operations that may be executed, preferably in software, on the architecture illustrated in FIG. 3 or 5 to process a storage request.
Figure 12:
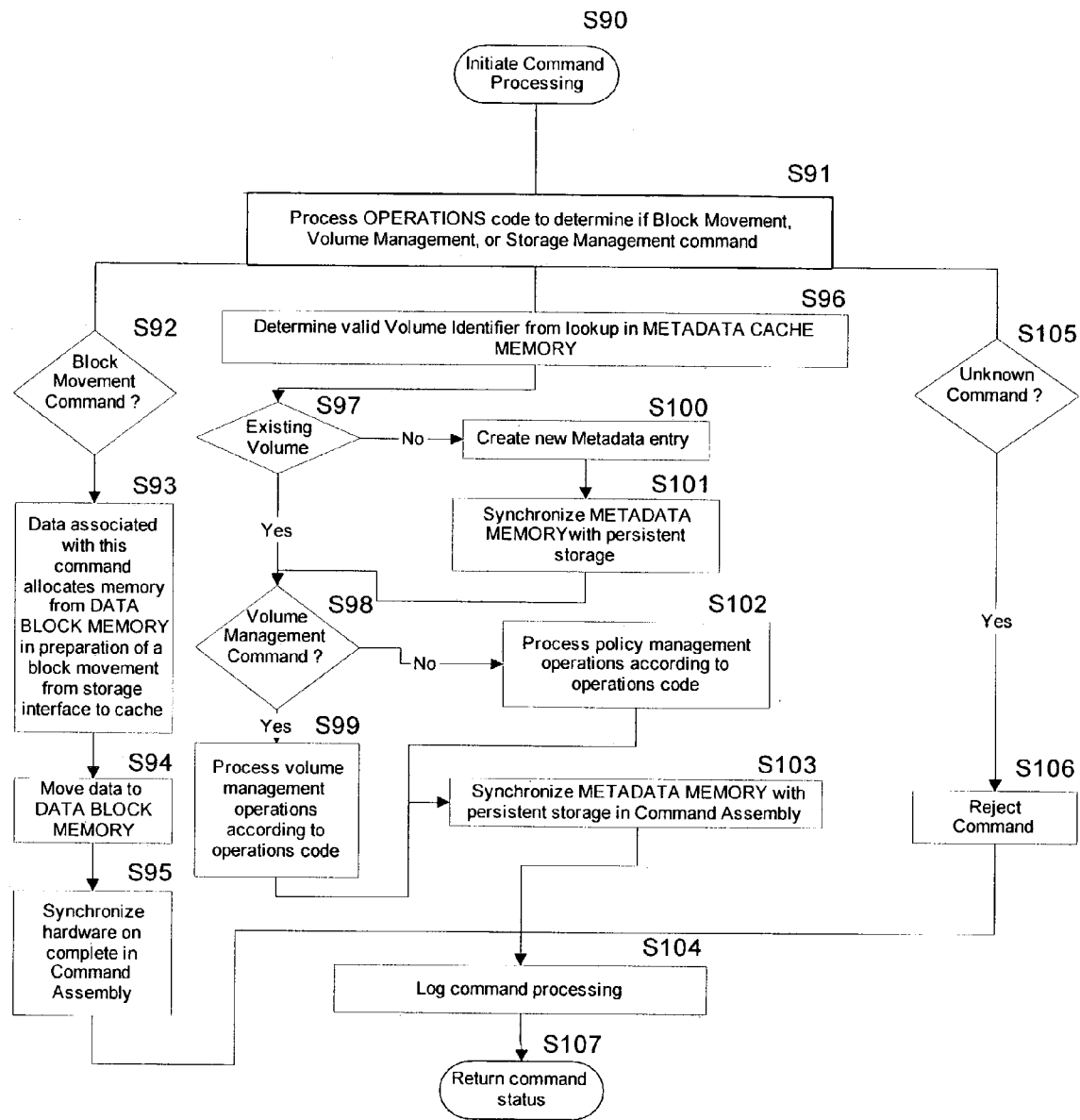

FIGS. 11 and 12 illustrate an exemplary sequence of operations that may be executed, preferably in software, on the architecture illustrated in FIG. 3 or 5 to process a storage request.

As illustrated in FIGS. 11 and 12, a request for storage operations from the host(s) (servers) is received at the command dispatching unit 90 (step S90). Because we have assumed that the functional units that execute SRM and SAM operations and policies are external to the storage system, the command dispatching unit 90 also receives SRM and SAM commands. Commands are routed to one of three management units: storage management 91, volume management 92, or block cache management 93, depending on the type of commands received (Step S91). Storage management 91 may include typical backup and restore, replication operations, and/or performance tuning operations. Volume management 92 may include creation, deletion, and expansion of storage volumes. Block cache management 93 may involve all cache entry and replacement management schemes.

Commands can also be directed to data block memory 97 (cache block memory) if the virtualization management unit 95 determines that the blocks of the LUN requested are in the data block memory 97. If the LUN's block data is not in the data block memory 97, then the virtualization management unit 95 is preferably determines where the physical blocks are located. The virtualization management 95 preferably uses the metadata cache 94 to lookup the appropriate virtualization table entries (step S96).

If the data requested is not in the data block memory 97, then the storage processor preferably sends the request for READ or WRITE, to/from storage devices using a sequence of commands in the Command Assembly unit 96. The command assembly unit 96 preferably dispatches a sequence of operations to the channel processors to initiate disk level READ/WRITE operations in disk array 6 in a manner that utilizes the intelligence and data parallelism of the channel processors.

As illustrated in FIG. 12, the storage processor (or processors) 22 (FIG. 3) initiates command processing (step S90). Although the process illustrated in FIG. 12 is primarily discussed for a single processor, those of skill in the art will appreciate that multiple processors can be used for scaling performance. In step S91, the storage processor 22 processes an operations code to determine if a block movement, volume management, or a storage management command is present. If a block movement command is present (step S92), as illustrated in step S93, the data associated with the block movement command is used to allocate memory from the data block memory 97 in preparation of a block movement from a storage interface (such as disk channel processor 26) to the block cache memory 24 (FIG. 3). Then a command is issued to move the specified data to data block memory 97 (step S94). After the data is moved, a command is issued to update the information related to the data and the memory allocation on the storage processor 22, the block cache memory 24 and the metadata cache 23 (step S95).

The storage processor 22 also determines if a valid volume identified is present in the command preferably from a lookup table in the metadata cache memory 23 (step S96). If there is an existing volume associated with the processing request (step S97, YES), and a volume management command is present (step S98, YES), then the volume management operation is processed according to an operations code associated with the existing volume management command (step S99). If there is not an existing volume (step S97, NO), then a new metadata entry is created (step S100), the metadata cache memory 23 is updated (synchronized) with the storage system. If a volume management command is not present (step S98, NO), then the storage processor 22 issues command to process policy management operations according to an established operations code (step S102). Once the volume management operations (step S99) or the policy management operations (step S102) have been processed, the metadata cache 23 is synchronized with the persistent storage in the storage processor 22.

If an unknown command is received (step S105), the storage processor 22 rejects the command (step S106).

After all commands have been processed (steps S92–S95, S96–S103) or rejected (step S106), the processing of the command is logged (step S104) and a status command is returned to the host (step S107).

The architecture illustrated in the central processing complex 20 in FIG. 3, 30 of FIGS. 5, and 50 of FIG. 6, may be entirely contained on one circuit board or a single integrated circuit chip and the functions may be performed by programmable software. Moreover, the processes illustrated in FIGS. 4A, 4B, 7, 8A–8C and 10–12 may be performed by programmable software on the storage processor 22 in FIG. 3, 32 in FIG. 5, or 52 of FIG. 6. The software that performs the processes illustrated in FIGS. 4A, 4B, 7, 8A–8C and 10–12 and may be performed by programmable software on the storage processor 22 in FIG. 3, 32 in FIG. 5, or 52 of FIG. 6 may be embodied in the form of data in a computer readable medium. A computer readable medium within the scope of this invention includes any medium, physical or metaphysical, which is capable of carrying information in a form which can be read by an appropriately configured computer and associated computer peripheral devices, including, but not limited to: an optical readable/writeable disc, a magnetic disk, a readable/writeable card, a magnetic tape, an electrical transmission signal for wireline or wireless transmission of data. The data associated with the programmable software may be in the form of packetized digital data.

The foregoing description of the invention is intended to only illustrate exemplary embodiments of the invention. Those of skill in the art will appreciate that there are many minor alterations to the disclosed exemplary embodiments within spirit and scope of the invention.

What is claimed is:

1. A storage controller for controlling a storage system for exchanging data between at least one host device and at least one storage device, the storage-controller comprising:
   a metadata cache memory operable to store virtualization tables to determine the memory address of stored information based on a virtual address of the stored information;
   a block cache memory controlled by said storage processor and operable to store a predetermined set of information for rapid access to a host device through said switching device;
   a switching device coupled to a host device, a storage device, the metadata cache and the block cache memory;
   a first storage processor coupled to the switching device for controlling a transfer of data from the metadata cache and the block cache memory via the switching device; and
   a second storage processor coupled to the switching device for controlling a transfer of data from the metadata cache and the block cache memory via the switching device, wherein the second storage processor is controlling a transfer of data from the metadata cache via the switching device at the same time as the first storage processor is controlling a transfer of data from the block cache memory via the switching device.

2. The storage controller of claim 1, wherein said host device comprises a server.

3. The storage controller of claim 1, wherein said at least one storage device includes at least one disk drive array.

4. The storage controller of claim 1, wherein said switching device is connected to said at least one host device through at least one host channel processor.

5. The storage controller of claim 4, wherein said at least one host channel processor is implemented through firmware.

6. The storage controller of claim 1, wherein said switching device is connected to said at least one storage device through at least one storage device channel processor.

7. The storage controller of claim 6, wherein said at least one storage device channel processor is implemented through firmware.

8. The storage controller of claim 1, wherein said switching device is comprised of an active switching system.

9. The storage controller of claim 8, wherein said active switching system is a Hyper Transport data switch that is connected to said at least one host device and said at least one storage device through a Hyper Transport bus.

10. The storage controller of claim 1, wherein said switching device is connected to said at least one storage device through a Fibre Channel processor.

11. The storage controller of claim 1, wherein said storage processor collects information on disk access, usage, and failure and enables storage resource management (SRM) and storage area management (SAM) functions.

12. The storage controller of claim 11, wherein the SRM and SAM functions are not specified by a policy external to the storage controller.

13. The storage controller of claim 11, wherein the SRM and SAM functions are specified by a policy external to the storage controller.

14. The method of claim 11, wherein the SRM and SAM functions are specified by a policy external to a storage controller.

15. The storage controller of claim 1, wherein the storage processor provides parallel high performance data paths for at least one of: fail over, making local copies and providing remote data copies.

16. The storage controller of claim 1, wherein the storage processor selects the data read from a storage device among a plurality of storage devices that retrieves the data first, thereby minimizing the time to first byte.

17. The storage controller of claim 1, wherein, as volume or block data is spread across multiple storage devices, the storage processor per forms automated performance tuning, including at least one of: load balancing, and hot spot removal.

18. The storage controller of claim 1, wherein the storage processor uses metadata to enforce secure access to storage at a block or a LUN level so that access rights may be enforced.

19. The storage controller of claim 1, wherein the storage processor uses metadata processing and channel processing for performing an automated fail over in case of storage device failure.

20. The storage controller of claim 1, wherein the storage processor uses metadata processing and storage device channel processing for performing at least one of: automated storage volume, block allocation, and dynamic expansion of storage volume for storage applications.

21. The storage controller of claim 1, wherein the metadata cache memory and block cache memory are independently scalable in size and performance to match system requirements.

22. The storage controller of claim 1, wherein the metadata cache and block cache may be combined in a single unified memory or distributed over multiple coherent or non coherent memories.

23. The storage controller of claim 1, further comprising redundant storage processors connected to said storage processor through one or more switching devices.

24. The storage controller of claim 1, wherein said switching device is connected to said at least one storage device through a serial protocol, including at least one of Hyper Transport, Fibre Channel and InfiniBand protocols.

25. The storage controller of claim 1, further comprising:
a host channel processor;
a third storage processor coupled to the switching device for receiving a command from the channel processor via the switching device at the same time as the first and second storage processors are controlling a transfer of data via the switching device.

26. The storage controller of claim 25, wherein the command includes a status command.

27. The storage controller of claim 25, wherein the command includes a control command.

28. The storage controller of claim 1, further comprising:
a host channel processor coupled between a host and the switching device;
a fourth storage processor coupled to the switching device for receiving and processing a non-I/O request from the host channel processor via the switching device at the same time as the first and second storage processors are controlling a transfer of data via the switching device.

29. A method for accessing a storage device, the method comprising:
receiving a request for a read operation, wherein the request includes a reference to a virtual storage space;
accessing a metadata cache memory with a first processor via a switch to obtain one or more logical locations corresponding to the virtual storage space;
determining that at least a part of the one or more logical locations is mapped to a block cache memory; and
transferring data from the at least a part of the one or more logical locations from the block cache memory to the first processor via the switch concurrently with transferring data from the metadata cache to a second processor via the switch.

30. The method of claim 29, wherein the data transferred from the metadata cache is in association with a read request.

31. The method of claim 29, wherein the data transferred from the metadata cache is in association with a write request.

32. The method of claim 29, further comprising:
performing storage resource management (SRM) and storage area management (SAM) functions.

33. The method of claim 32, wherein the SRM and SAM functions are not specified by a policy external to the storage controller.

34. A method for accessing a storage device, the method comprising:
transferring data from a metadata cache memory to a first processor via a switch to obtain one or more logical locations corresponding to a virtual storage space;
determining that at least a part of the one or more logical locations is mapped to a block cache memory; and
transferring data from the at least a part of the one or more logical locations from the block cache memory to the first processor via the switch concurrently with transferring data via the switch from the metadata cache memory to a second processor for a subsequent data operation.

35. The method of claim 34, wherein the subsequent data operation includes a write operation.

36. The method of claim 35, wherein the subsequent data operation includes a read operation.

37. The method of claim 35, further comprising:
performing storage resource management (SRM) and storage area management (SAM) functions.

38. The method of claim 37, wherein the SRM and SAM functions are not specified by a policy external to the storage controller.

39. The method of claim 37, wherein the SRM and SAM functions are specified by a policy external to a storage controller.

* * * * *